(12) United States Patent
Levi

(10) Patent No.: US 6,833,787 B1
(45) Date of Patent: Dec. 21, 2004

(54) METHOD AND SYSTEM FOR DEVICE TRACKING

(75) Inventor: Andrew E. Levi, Plano, TX (US)

(73) Assignee: ASAP Software Express, Inc., Buffalo Grove, IL (US)

( * ) Notice: Subject to any disclaimer, the term of this patent is extended or adjusted under 35 U.S.C. 154(b) by 0 days.

(21) Appl. No.: 09/568,082

(22) Filed: May 9, 2000

Related U.S. Application Data

(63) Continuation-in-part of application No. 09/415,191, filed on Oct. 7, 1999, now Pat. No. 6,477,667, which is a continuation-in-part of application No. 09/415,044, filed on Oct. 7, 1999, now abandoned.

(60) Provisional application No. 60/188,452, filed on Mar. 10, 2000, and provisional application No. 60/167,379, filed on Nov. 24, 1999.

(51) Int. Cl.$^7$ ................................................ G08B 1/08
(52) U.S. Cl. ............................ 340/539.13; 340/539.11; 340/539.19
(58) Field of Search ..................... 340/539.11, 539.13, 340/539.19, 539.25, 572.1, 572.4, 573.1, 573.3, 573.4, 568.1, 571; 702/182, 185, 188; 709/206, 219, 224; 455/450, 456, 457; 342/357.07

(56) References Cited

U.S. PATENT DOCUMENTS

| 4,545,011 A | | 10/1985 | Lyon et al. ................. 364/200 |
|---|---|---|---|
| 4,800,384 A | | 1/1989 | Snijders ................. 340/825.52 |
| 4,956,863 A | | 9/1990 | Goss ............................. 380/30 |
| 5,223,844 A | * | 6/1993 | Mansell et al. ........ 342/357.07 |
| 5,343,529 A | | 8/1994 | Goldfine et al. .............. 380/23 |

(List continued on next page.)

FOREIGN PATENT DOCUMENTS

| EP | 0 740 037 A1 | 4/1995 | ........... E05B/49/00 |
|---|---|---|---|
| EP | 0 822 498 A1 | 2/1998 | ........... G06F/11/30 |
| EP | 0 899 648 A2 | 8/1998 | ............. G06F/1/00 |
| EP | 0 869 640 A1 | 10/1998 | ........... H04L/12/28 |
| EP | 0 951 155 A1 | 10/1999 | ........... H04L/12/24 |
| WO | WO 93/01550 | 1/1993 | ........... G06F/11/34 |
| WO | WO 96/03728 | 2/1996 | ........... G08B/25/01 |
| WO | WO 98/04967 | 2/1998 | ............. G06F/1/00 |
| WO | WO 98/21658 | 5/1998 | ........... G06F/11/22 |
| WO | WO 98/43151 | 10/1998 | ............. G06F/1/00 |
| WO | WO 98/431151 | 10/1998 | ............. G06F/1/00 |
| WO | WO 99/08420 | 2/1999 | ........... H04L/12/24 |

OTHER PUBLICATIONS

XP-002155308: Author: Christopher Nolan, "A Look at e-Test Suite 3.1 by RSW", Software Testing & Quality Engineering Magazine, (2 pages), 07 & 08/99.

XP-002161813: Author: Kevin Reichard, "Scoping Out Web Performance", UNIX Review's Performance Computing (3 pages), 06/99.

(List continued on next page.)

*Primary Examiner*—Van T. Trieu
(74) *Attorney, Agent, or Firm*—Baker Botts L.L.P.

(57) ABSTRACT

A user contracts for service with an operations center (12) in order to provide monitoring and tracking services for a plurality of devices (30). After contracting for service, the operations center provides an agent (81) for download by a user to one or more of the user's devices (14, 16, 18, 20, 22, 630) for which the user has contracted for service. The agent is installed on the devices associated with the user's sites and communicates with the operations center. A listening process (710) at the operations center listens for periodically sent beacon packets (640) generated by a monitored device (630). Using location indicators included with the beacon packets and generated by an agent (681) on the monitored device, the operations center provides notifications (712) to a handler regarding the location of the monitored device if the monitored device is reported as stolen. A tracking response (714) may be communicated to the monitored device to take special actions when the device is stolen and to update the agent and other portions of the monitored device.

30 Claims, 15 Drawing Sheets

U.S. PATENT DOCUMENTS

| | | | | |
|---|---|---|---|---|
| 5,598,528 | A | | 1/1997 | Larson et al. ............. 395/182.5 |
| 5,631,642 | A | * | 5/1997 | Brockelsby et al. ......... 340/993 |
| 5,731,785 | A | | 3/1998 | Lemelson et al. ........... 342/357 |
| 5,748,084 | A | | 5/1998 | Isikoff ......................... 340/568 |
| 5,751,936 | A | | 5/1998 | Larson et al. .......... 395/182.05 |
| 5,751,964 | A | | 5/1998 | Ordanic et al. ......... 395/200.54 |
| 5,768,501 | A | | 6/1998 | Lewis .................... 395/185.01 |
| 5,790,548 | A | | 8/1998 | Sistanizadeh et al. ....... 370/401 |
| 5,802,280 | A | | 9/1998 | Cotichini et al. ......... 395/200.3 |
| 5,812,819 | A | | 9/1998 | Rodwin et al. .............. 395/500 |
| 5,826,195 | A | * | 10/1998 | Westerlage et al. .......... 455/456 |
| 5,928,328 | A | | 7/1999 | Komori et al. .............. 709/223 |
| 5,936,526 | A | | 8/1999 | Klein .......................... 340/571 |
| 5,963,131 | A | | 10/1999 | D'Angelo et al. ........ 340/568.1 |
| 6,405,213 | B1 | * | 6/2002 | Layson et al. ............ 340/573.1 |
| 6,553,336 | B1 | * | 4/2003 | Johnson et al. .............. 702/188 |
| 6,581,092 | B1 | * | 6/2003 | Motoyama et al. .......... 709/219 |

OTHER PUBLICATIONS

XP-002161814: Author: Avesta Technologies, "Avesta Technologies (R) Unveils Web Site Performance, Availability and Integrity Monitoring Solution", Screaming Media, PR Newswire (2 pages), Aug. 2, 1999.

PCT Written Opinion (PCT Rule 66) mailed Aug. 10, 2001, re PCT/US00/27630 Aug. 10, 2001 filed Oct. 6, 2000, Applicant's reference: 066782.0151.

XP-000799765: Author: Rajiv Shukla, et al., "Toss: Tonics for Operation Support Systems System Management using the World Wide Web and intelligent software agents", IEEE, pp. 100–109, Nov. 3, 1997.

XP 000496023: Author: Mary Jander, "LAN Analysis: The View From Layer 7", 8178 Data Communications, No. 3 pp. 47–48, Mar. 24, 1995.

Author: Woldberg, Robert C., et al., "Method and System for Remote Device Monitoring", specification (46 pages) and drawings (9 pages) (066782.0102), Oct. 7, 1999.

Author: Levi, Andrew E., "Method and System for Providing Technical Support with User Approval", specification (45 pages) and drawings (9 pages) (066782.0103), Oct. 7, 1999.

Author: Levi, Andrew E., "Method and System for Device Registration", specification (88 pages) and drawings (15 pages) (066782.0126), May 9, 2000.

Author: Levi, Andrew E., "Method and System for Uniform Resource Locator Status Tracking", specification (91 pages) and drawings (15 pages) (066782.0130), May 9, 2000.

Author: Levi, Andrew E., "Method and System for Simple Network Management Protocol Status Tracking", specification (88 pages) and drawings (15 pages) (066782.0133), May 9, 2000.

Author: Levi, Andrew E., "Method and System for Device Status Tracking", specification (89 pages) and drawings (15 pages) (066782.0139), May 9, 2000.

XP 000043286: Author: IBM Corporation, New York, "Automated Problem Reporting", IBM Technical Disclosure Bulletin, vol. 32, No. 6A, pp. 466–468, Nov., 1989.

Author: Woldberg, Robert C., et al., "Method and System for Remote Device Monitoring", specification (46 pages) and drawings (9 pages) (066782.0102), Filed Oct. 7, 1999.

Author: Levi, Andrew E., "Method and System for Providing Technical Support with User Approval", specification (45 pages) and drawing (9 pages) (066782.0103), Filed Oct. 7, 1999.

Author: Levi, Andrew E., "Method and System for Device Registration", specification (88 pages) and drawings (15 pages) (066782.0126), Filed May 9, 2000.

Author: Levi, Andrew E., "Method and System for Uniform Resource Locator Status Tracking", specification (19 pages) and drawings (15 pages) (066782.0130), Filed May 9, 2000.

Author: Levi, Andrew E., "Method and System for Simple Network Management Protocol Status Tracking", specification (88 pages) and drawings (15 pages) (066782.0133), Filed May 9, 2000.

Author: Levi, Andrew E., "Method and System for Device Status Tracking", spefication (89 pages) and drawings (15 pages) (066782.0139), Filed May 9, 2000.

* cited by examiner

METHOD AND SYSTEM FOR DEVICE TRACKING

RELATED APPLICATIONS

This application is a continuation-in-part of U.S. patent application Ser. No. 09/415,191 entitled "Method and System for Remote Device Monitoring" filed Oct. 7, 1999 now U.S. Pat. No. 6,477,667; a continuation-in-part of U.S. application Ser. No. 09/415,044 entitled "Method and System for Providing Technical Support with User Approval" filed October 7, 1999 which is abandoned; claims priority to U.S. provisional application Ser. No. 60/167,379 entitled "Method and System for Remote Device Monitoring" filed Nov. 24, 1999; and claims priority to U.S. provisional application Ser. No. 60/188,452 entitled "Internet-Based Asset Management" filed Mar. 10, 2000.

This application is related to co-pending U.S. patent application Ser. No. 09/568,454 entitled "Method and System For Uniform Resource Locator Status Tracking" filed May 9, 2000; co-pending U.S. patent application Ser. No. 09/567,656 entitled "Method And System For Simple Network Management Protocol Status Tracking" filed May 9, 2000; co-pending U.S. patent application Ser. No. 09/568,083 entitled "Method And System For Device Registration" filed May 9, 2000; and co-pending U.S. patent application Ser. No. 09/567,852 entitled "Method And System For Device Status Tracking" filed May 9, 2000.

TECHNICAL FIELD OF THE INVENTION

This invention relates in general to networked computers and, more particularly, to a method and system for device tracking.

BACKGROUND OF THE INVENTION

As computer systems and networks have grown in complexity and usefulness, businesses have become increasingly reliant on the proper functioning of their computers and the networks which connect the computers. As such, a failure in any particular workstation or server may have a major impact on the productivity of a business.

Comprehensive systems management has traditionally provided bi-directional monitoring and control of servers, computers and the networks. Bi-directional monitoring allows for data and control to flow both from the network management system to the managed servers, computers and networks, and from the managed servers, computers and networks to the network management system. For example, the bi-directional monitoring and control of traditional comprehensive management systems allows the remote management system to take direct control of the servers, computers and networks at the monitored location. Traditional comprehensive systems monitoring software has been complex and expensive. The expense of traditional comprehensive systems management applications have limited their use to only the largest institutions. In addition, the bi-directional nature of traditional comprehensive systems management has introduced security issues which often require expensive and time-consuming solutions to fix. For example, the fact that managed computer systems may be controlled and modified by a remote management system leaves open the possibility that a malicious hacker or other intruder could take unauthorized control of the managed server, computer or network and damage the business using the managed server, computer or network by stealing information, changing data and erasing data. Also, traditional monitoring systems have provided minimal device tracking capabilities.

SUMMARY OF THE INVENTION

From the foregoing, it may be appreciated that a need has arisen for a method and apparatus for device tracking.

According to the present invention, a device tracking system is provided to address this need, and involves a communications network and an agent residing at a device. The agent is unidirectionally coupled to the communications network and is operable to generate a beacon packet according to predetermined criteria. The beacon packet has at least one location indicator therein. The system further involves a listener coupled to the communications network. The listener is operable to receive the beacon packet and generate a response packet in response to receiving the beacon packet. The response packet is operable to control the device. The system also involves a handler operable to act in response to the beacon packet.

According to another embodiment of the present invention, a method for device tracking is provided to address this need, and involves generating a beacon packet associated with a device based on predetermined criteria and communicating the beacon packet over a communications link to a listening process. The method further involves determining at least one current location indicator associated with the device and determining whether the device has moved from a previous location. The method also involves providing the location indicators to a handler in response to the beacon packet and controlling the device based on the location indicators.

According to yet another embodiment of the present invention, a method for theft tracking is provided to address this need, and involves generating a beacon packet associated with a device based on predetermined criteria and communicating the beacon packet over a communications link to a listening process. The method further involves determining whether the device has been stolen and determining at least one location indicator associated with the device. The method also involves providing the location indicator to a handler in response to the beacon packet and controlling the device when the device has been stolen.

DESCRIPTION OF THE DRAWINGS

A better understanding of the present invention will be realized from the detailed description that follows, taken in conjunction with the accompanying drawings, in which.

DETAILED DESCRIPTION OF THE INVENTION

Figure 1:
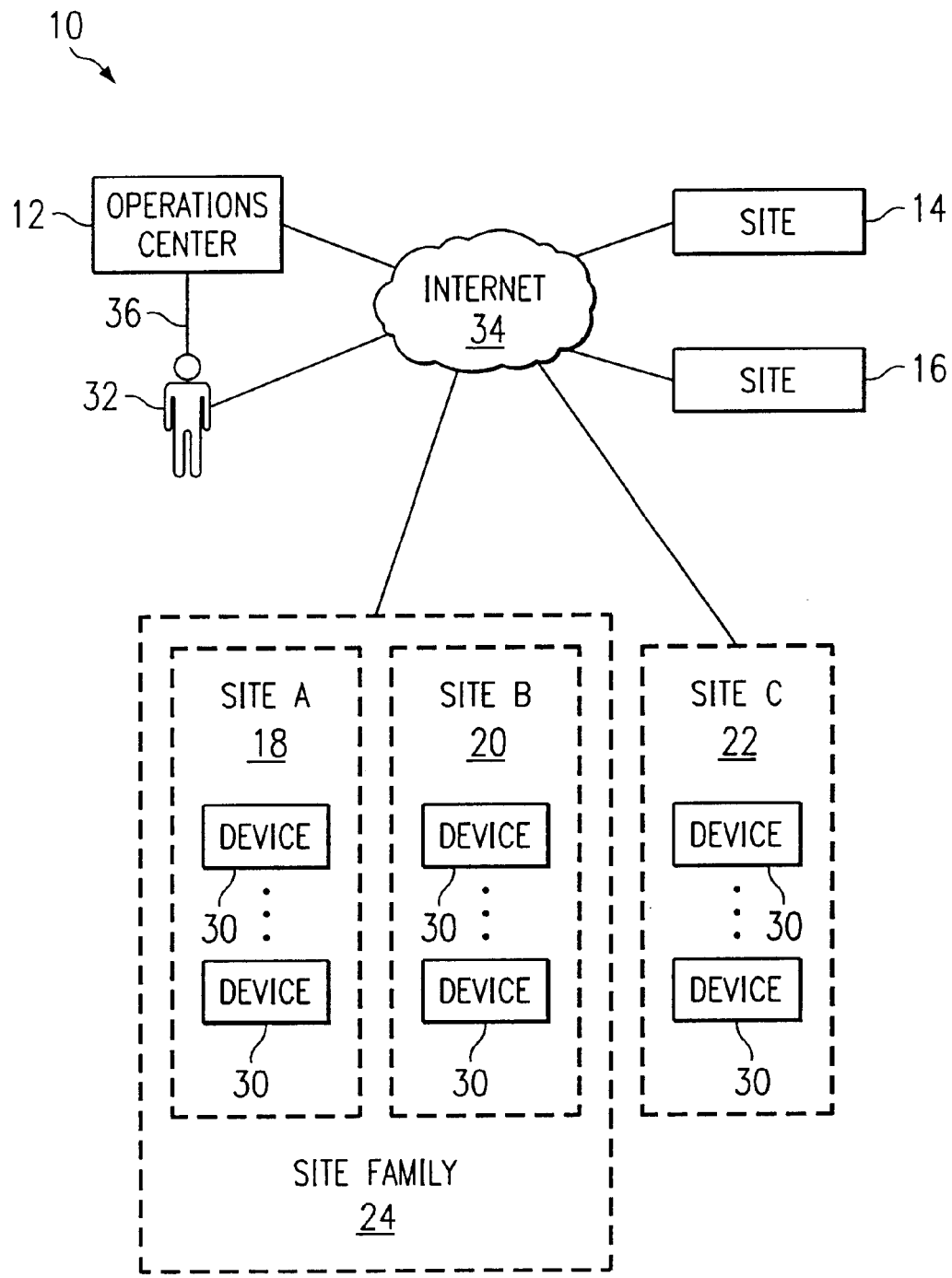
FIG. 1 is a block diagram showing an exemplary configuration of a remote device monitoring system utilizing the present invention.

FIG. 1 is a block diagram showing an exemplary configuration of an remote device monitoring system 10 utilizing the present invention.

Remote device monitoring system 10 may include an operations center 12, one or more sites 14, 16, 18, 20 and 22, one or more devices 30, and one or more responders or contacts 32. A communications network such as Internet 34 may be used to couple operations center 12, sites 14, 16, 18, 20 and 22, and contact 32. Contact 32 may further be connected to operations center 12 by some other communications link 36. Communications link 36 may be a pager, a phone, a fax machine, electronic mail or another suitable communications device.

Each site 14, 16, 18, 20 and 22 may include one or more devices 30. Hereinafter sites will be referred to generally as "site or sites 14" with the other reference numbers (16, 18, 20 and 22) being used to refer to particular sites. Sites 14 may represent physical and logical entities that have contracted with operations center 12 for monitoring services. Site 14 may be a company, a department within a company, a building, a geographic area, a logical entity occupying multiple geographic locations, or other suitable logical or physical entities capable of being monitored over Internet 34 from operations center 12. The monitoring services provided by operations center 12 may include the monitoring of various operating parameters or predetermined status indicators (not shown) which indicate the present or predicted future health of devices 30 being monitored. The monitoring services provided by operations center 12 may also include the tracking of devices 30, when devices 30 are being moved from place-to-place or when devices 30 have been stolen. The process for contracting for service will be described in more detail in association with FIG. 2.

Device 30 may be any of a plurality of electronic devices having simple or advanced data processing capabilities and health-indicative operating parameters that may be monitored by and communicated to a remote location, such as operations center 12. Device 30 may also include location information that may be monitored by and communicated to a remote location, such as operation center 12. Each device 30 is associated with at least one site 14. For example, device 30 may be a server, a workstation, a personal computer, a laptop, a soft drink dispensing machine, a network postage machine, a printer, a personal digital assistant, a heating/ventilation/air conditioning (HVAC) system or another suitable device. Health-indicative operating parameters are status indicators which may be used to determine the current or predicted future operational status or health of device 30. The operating parameters, for example, may indicate that device 30 could cease operating in the near future, that device 30 is operating slower or less optimally than expected, that device 30 is more heavily loaded with processing requests than it should be, that the persistent storage associated with device 30 may be failing, and that device 30 is running out of supplies and inventory, such as cans of soft drink or a printer running out of ink and paper. Other status indicators associated with device 30 that may be utilized in the repair, debugging or monitoring of device 30 may also be used.

The operating parameters may vary based on the particular device 30 being monitored. For example, if device 30 being monitored is a network postage meter then the operating parameters may include the remaining postage available on the meter and whether the remaining postage has fallen below a particular level, whether the amount of ink is low, and whether the system is operational.

The health indicative operating parameters may vary based on the operating system and hardware used by device 30. Generally, the health indicative operating parameters may monitor the available disk space for a particular user, the number of failed log-in attempts for one or more users, the number of license connections currently available on the server and the network traffic load on the server.

For example, if device 30 utilizes the Windows 95/98 operating system, the health indicative operating parameters may include the available dynamic memory and whether it has fallen below a particular threshold, the processor utilization percentage and whether the utilization exceeds or drops below a particular threshold for a specific amount of time, system errors, general protection faults, system reboots, the relay of an event from a proprietary protocol, such as the Compaq Insight Manager, and the number of bad blocks on a hard drive. The health indicative operating parameters may further include the available memory, CPU utilization, available disk space, available system resources, available graphics device interface (GDI) resources, available user resources, whether the hard drives are on-line, and information regarding system start-up. The available memory may represent the percentage of total memory that is not being used, the CPU utilization may represent the percentage of time that the CPU is not idle, the available disk space may include the percentage of the total disk space that is not being used on each logical and physical hard drive on device 30, the available system resources may include the percentage of the total system resources that are not being used, the GDI resources may include the percentage of the total GDI resources that are not currently in use, and user resources may include the percentage of the total user resources that are not being used.

If device 30 is using the Windows NT operating system, then the health indicative operating parameters may include the available memory, the CPU utilization for each CPU, the available hard disk space, whether the hard drive is on-line, information regarding system start-up, event log alerts, application log alerts, Internet Information Service status, Structured Query Language service status and security log alerts. The logs may be monitored for particular alerts or information and generate alerts based on that information. The available memory may include the percentage of total memory, physical memory and virtual memory, either individually or as a group, that is not being used. The CPU utilization for each CPU may include the percentage of time each CPU is not in an idle state, and the available hard disk space may include the percentage of unused space on each logical and physical hard drive.

If device 30 is using the Novell Netware operating system, the health indicative operating parameters may include the available cache buffers, the CPU utilization, the available disk space, volume status, system start-up information, the number of purgable blocks on a volume, the forged pack count and a count of invalid sequence numbers. The available cache buffers may include the percentage of the total cache buffers that are not being used, the CPU utilization may represent the percentage of time that the CPU is not idle, the available disk space may represent the percentage of unused space on each volume managed by the Novell Netware operating system, and the volume information may include whether a particular volume is on-line and operating.

Site family 24 groups a plurality of sites 18 and 20 so that these sites may be administered by a single administrator. The grouping of sites 18 and 20 into site family 24 does not preclude the sites 18 and 20 from having their own individual administrators. In one embodiment of the present invention, sites 18 and 20 in site family 24 are organized with site 18 as the parent site and site 20 organized as the child of the parent site. The administrator of the site which becomes the parent site becomes the administrator of site family 24.

Figure 2:
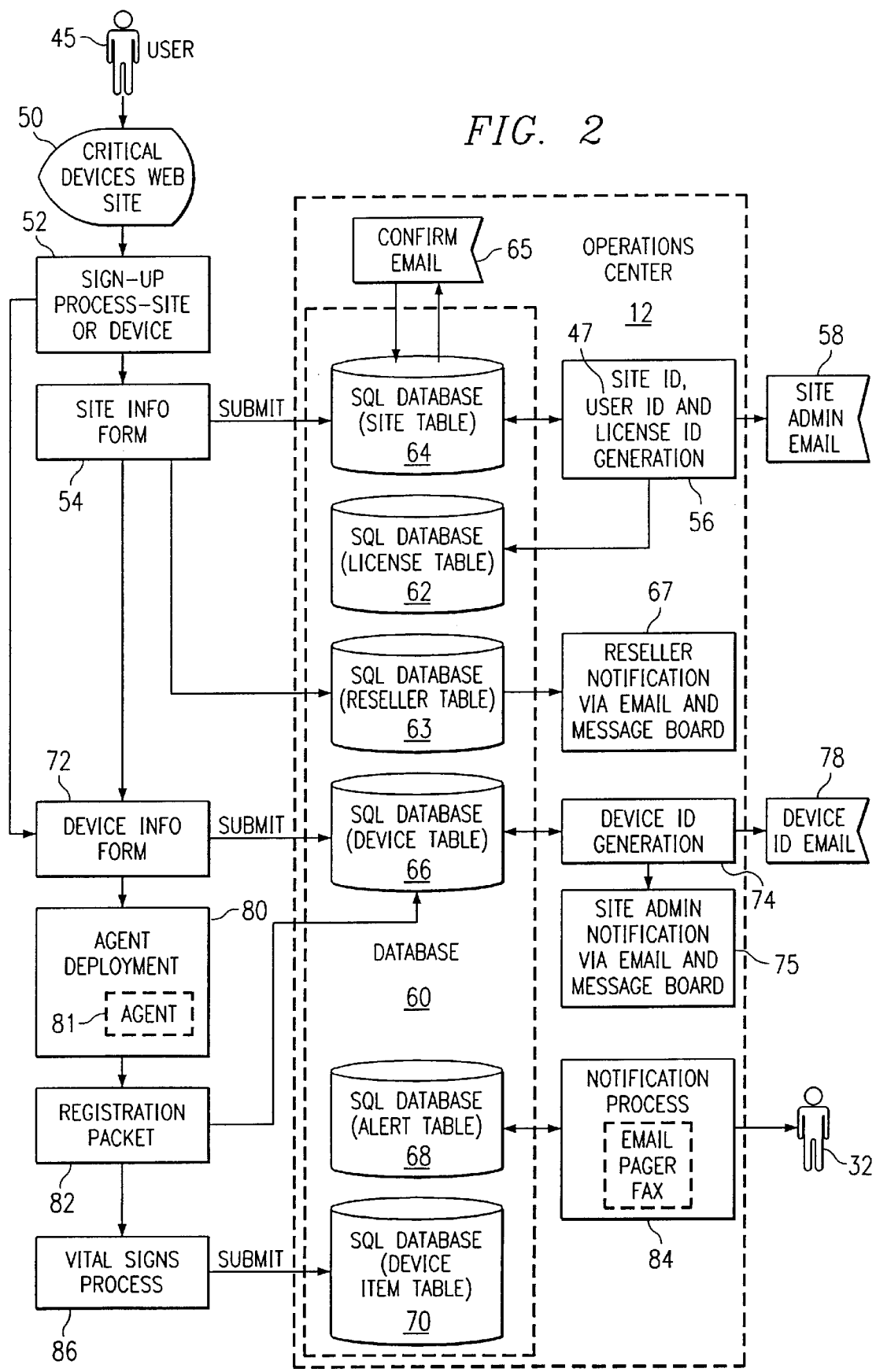
FIG. 2 is a flow diagram of a process for signing up with or contracting for a service with the remote device monitoring system utilizing the present invention.

Contact 32 represents one or more personnel who are contacted in order to respond to and repair problems associated with devices 30 monitored by remote device monitoring system 10. In the disclosed embodiment, contact 32 may be notified by any one or more means of communication such as electronic mail, a pager, a phone, or a fax, and may respond to operations center 12 that the notification has been received by, for example, posting a message on message board 93 (FIG. 2). This process is described in more detail in association with FIG. 2.

Internet 34 may be the Internet or any other suitable combination of local area networks, medium, and metropolitan area networks, wide area networks, intranets, and other wireless or wire-based communication links.

FIG. 2 is a flow diagram of a process for signing up with or contracting for service with remote device monitoring system 10. The sign-up process is initiated and performed by a user 45 in order to contract for monitoring service from remote device monitoring system 10. The user 45 is a human user of the present invention. The sign-up process is used to determine and allocate the number of licenses the user 45 will require, as well as acquire information from the user 45. In the disclosed embodiment, at least two types of licenses are available, a server license and a workstation license. In addition, one or more distinct sentinel licenses may be available for web, device and SNMP sentinels (described in association with FIGS. 14–16), device tracking (described in association with FIGS. 11, 12 and 13) and other operations. The server license is required for each server the user 45 wishes to have monitored by system 10 and the workstation license is required for each workstation, PC or other non-server device that the user 45 wishes to be monitored. It should be noted that both servers and non-server devices may be devices 30. In the disclosed embodiment, the sign-up process is initiated by retrieving a web page 50 associated with remote device monitoring system 10 using a web browser (not shown). Web page 50 may comprise a plurality of web pages and may be stored on a web server (not shown) at operations center 12 or another suitable location. The sign-up process may be initiated in other ways, such as by a telephone call or electronic mail to operations center 12 or a service center (not shown), or by another suitable method by which the necessary information for server and workstation licenses may be obtained. Regardless of the contact method used, the sign-up process and the necessary information remain substantially similar.

At block 52, the user 45 requests, via web page 50, that the sign-up process begins. At block 54, web page 50 presents a site information form to user 45 which requires the user 45 to fill out specific information to register the user's site. Typically, the user 45 initiating or signing-up with remote device monitoring system 10 for a site is a site administrator 140 (FIG. 4) who has responsibility over the site. The site information requested by web page 50 may include:

General Information:

Administrator First Name: _____

Administrator Last Name: _____

Site Name: _____

Email Address: _____

Address 1: _____

Address 2: _____

City: _____

State: _____

Zip: _____

Phone: _____

Fax: _____

Alert Contact Information:

Alert Contact First Name: _____

Alert Contact Last Name: _____

Contact this person by: (Select One) Email, Pager, Fax

Contact Phone Number or Email: _____

License Information:

License Count:

(You must have at least one license)

Workstations: _____ PDA: _____ Other: _____

Servers: _____ Service: _____

-continued

Reporting Information:

Do you want to email an event log for this site?

If so, how often? _____

Email Address for Log: _____

The site information provided using web page 50 is then submitted by the user 45 to a database 60 in order to generate, at block 56, the license identifiers and the site identifier. The user 45 is informed of the generated site identifier and associated password at block 58 by an electronic mail message sent to the user 45. In particular, the electronic mail message is sent to the electronic mail address of the site administrator; however, the electronic mail message may be sent to any electronic mail address desired by the user 45. In the disclosed embodiment, the electronic mail address used is the electronic mail address entered for the site administrator in the site information. In addition, the licenses generated at block 56 are stored in a license table 62 which is part of the database 60. The site information is stored in a site table 64 portion of database 60. A confirmation electronic mail 65 having the site information therein may be sent to the user 45 so that the user 45 can confirm that the information stored in site table 64 is correct. In the disclosed embodiment, the electronic mail address used is the electronic mail address entered for the site administrator in the site information.

Creation of the site identifiers and license identifiers in block 56 may also trigger creation of a user identifier 47. If user 45 registering the new site already has an associated user identifier 47, then a new user identifier will not be created. If user 45 registering the new site has no associated user identifier 47, then a new user identifier 47 will be created.

User identifier 47 uniquely identifies each human user 45 associated with remote device monitoring system 10. User identifier 47 has an associated password, access set and may have other information, such as a user name and an office location, associated therewith. The password, access set and other information are stored in database 60. The access set defines the level of access to sites 14, site families 24 and devices 30 of the associated user 45. In particular, the access set defines the status of user 45 as a device administrator 100 (described in more detail in FIG. 3), the site administrator 140 (described in more detail in FIG. 4), a technical administrator 220 (described in more detail in FIG. 8) or a technician 221 (described in more detail in FIG. 8). Each user 45 may have one or more of the above statuses associated therewith. The access set is stored in database 60 and may define the user's 45 access by, for example, storing device identifiers and site identifiers associated with the devices 30 and sites 14, respectively, the user 45 is allowed to access. The access set may also associate the level of access permitted to the user 45 for each device and site identifier associated with the user 45 such as being site administrator 140 with full read and write access to all devices 30 associated with the site 14.

Resellers may also register new sites for clients of the reseller instead of people associated with the site signing-up directly with remote device monitoring system 10. Reseller table 63 stores information describing one or more resellers and allow the resellers to sign up devices 30 of customers of the reseller for monitoring service. A confirmation electronic mail 67 may also be sent to a reseller and posted on message board 93 following site and device registration. The confirmation electronic mail 67 includes all appropriate information so that a reseller may invoice or charge the user 45 for the monitoring service that the reseller is providing to the user. The reseller may be a business which resells the remote device monitoring service provided by operations center 12 to a particular user 45. For example, a reseller may purchase remote device monitoring services from Critical Devices, Inc., the assignee of the present application, and resell the service to a particular user 45. The reseller may invoice or charge the user 45 directly for the remote device monitoring services or may use a message board 93 to provide invoicing between operations center 12 and the user 45.

In one embodiment, only the reseller will invoice the user 45. The operations center 12 may request a reseller identifier as part of the site information in order to properly bill the reseller for the monitoring service. The reseller identifier also provides the reseller the ability to request licenses for sites 14 and devices 30 for the user 45.

Proceeding to block 72, after the user 45 has provided the user identifier 47 and password from block 56, the user 45 may receive a second web page having a device information form which the user may fill out for one or more devices 30 that the user wishes to have tracked and monitored by remote device monitoring system 10. Typically, the device information is provided by the user 45 with site administrator 140 or device administrator 100 access. Device administrator 100 is typically the user 45 of the particular device 30 being signed-up for monitoring, or someone who regularly uses that device 30. A license is required for each device 30 to be tracked and monitored. The device information form may request the following information:

General Information:

Owner First Name: _____

Owner Last Name: _____

Machine Name: _____

Office Number: _____

Email Address: _____

Address 1: _____

Address 2: _____

City: _____

State: _____

Zip: _____

Reporting Information:

Do you want us to email you an event log for this device? _____

If so, how often? Weekly, monthly, quarterly, never

Email Address for Log: _____

Notes: _____

The completed device information form is then submitted to a device table 66 portion of database 60 and, at block 74, a device identifier is generated. The device identifier generated in block 74 is also stored in device table 66. At block 75 the device identifier is provided to user 45 who is identified as site administrator 140 of the site having the just registered device 30. The device identifier may be provided to site administrator 140 by electronic mail and message board 93. Alternatively, device identifier may be generated automatically. A seed application is distributed to support automatic device identification generation. The seed application is described in more detail in association with FIG. 11. The seed application comprises an executable application which may be deployed via electronic mail, electronic file transfer over a network, physical distribution, such as on a disk or CD-ROM, or by any other suitable method. Once the seed application is received at device 30, the seed application executes to generate a device identifier. A device identifier is generated by the seed using one or more of a device serial number associated with device 30, a desktop management interface (DMI) address, a network interface card (NIC) address, such as a MAC address, a serial number associated with the central processing unit (CPU) such as that used on the Intel Pentium III processor by Intel Corporation of Santa Clara, Calif. The seed process may also be distributed with a preset device identifier to be associated with device 30. Device 30 then transmits the generated device identifier to operation center 12 over Internet 34 to be stored in device table 66. The device identifier may then be provided to site administrator 140 and/or device administrator 100 by electronic mail and message board 93.

The device identifier may then be sent to the user 45 who is device administrator 100 and the user 45 who is site administrator for the newly registered device 30, via electronic mail, in block 78 and displayed on the user's display (not shown). In the disclosed embodiment, the electronic mail is sent to user 45 who is identified as the device administrator 100.

Next, at block 80, an agent 81 is deployed to the device or devices 30 that the user 45 has registered for monitoring in block 72. In the disclosed embodiment, agent 81 is a file which is downloadable from a server via the file transfer protocol (FTP) or HTTP and is a C++ based operating system extension specific to a particular operating system, but may be an applet or application written in any suitable platform-independent programming language such as C, Java and Perl. Agent 81 may be installed on device 30 automatically or manually by the user 45 and performs the actual monitoring of device 30. In particular, agent 81 tracks the various operating parameters which are used to determine the current health of device 30 and generates alerts when device 30 may be experiencing problems. The operation of the agent is described in more detail below in association with FIG. 6.

After agent 81 is deployed to device 30, a registration trap 82 is performed by agent 81. Registration trap 82 is a test to ensure that communication between agent 81 on device 30 and operations center 12 is fully operational. In particular, registration trap 82 will generate a registration trap alert which is transmitted to operations center 12 and stored in table 66. The registration trap alert transmitted to operations center 12 includes the media access control (MAC) address of device 30. The combination of the MAC address and the device identifier associated with device 30 may be used by operations center 12 to ensure that the user has installed the agent on the particular device 30 for which the user has obtained the device identifier. When operations center 12 receives the registration trap alert it will be stored in an alert table 68 portion of database 60.

Then, at block 86, a inventory process is performed by agent 81 on device 30. The inventory process may be an optional process used to determine the present and predicted future health of device 30 with respect to factors other than those monitored by remote device monitoring system 10. For example, the inventory process may be used to determine the year 2000 compliance of device 30. The information collected by the inventory process may include the following:

Device Inventory for ANDREW

DeviceID 194

Oct. 6, 1999

SYSTEM INFORMATION:
   Windows 98 version 4.10 build 1998,
   GenuineIntel, Pentium (r) Processor, Intel MMX (TM) Technology
   EPP runtime BIOS—Version 1.1 Copyright (c) 1982, 1984
Compaq C, Feb. 26, 1998
   ISA
   Total physical memory is 32 Megabytes.
   Total Space on drive c:\ is 2047 Megabytes
   Total Space on drive d:\ is 1850 Megabytes
PERFORMANCE:
   CUP Utilization: 67%
   Space on drive C: is 16% free.
   Space of drive D: is 96% free.
   Available Resources:
     Memory: 99%
     System: 79%
     User: 79%
     GDI: 86%
MULTIMEDIA DEVICES:
   Device: ES1878 Control Interface (WDM)
   Manufacturer: ESS Technology, Inc.
   Device: ES1878 Plug and Play AudioDrive (WDM)
   Manufacturer: ESS Technology, Inc.
   Device: Gamesport Joystick
   Manufacturer: Microsoft
   Device: Wave Device for Voice Modem
   Manufacturer: Compaq
   Device: Microsoft Kernel System Renderer
   Manufacturer: Microsoft
VIDEO CARDS:
   Device: Chips and Tech. 68554 PCI (COMPAQ)
   Manufacturer: Chips and Technologies, Inc.
   Revision: 162
MONITORS:
   Device: (Unknown Monitor)
   Manufacturer: (Standard monitor types)
INPUT DEVICES:
   Device: Standard 101/102-Key or Microsoft Natural Keyboard
   Manufacturer: (Standard keyboards)
   Device: Standard PS/2 Port Mouse
   Manufacturer: (Standard mouse types)
MODEMS:
   Device: Compac Armada 1500 Series 560CL
   Manufacturer: Compaq
NETWORK ADAPTERS:
   Device: Infrared PnP Serial Port
   Manufacturer: (Infrared COM port or dongle)
   Device: Compaq Integrated NetFlex-3/P Controller
   Manufacturer: Compaq
   Revision: 016
NETWORK PROTOCOLS:
   Device: IPX 32-bit Protocol for the Novell NetWare Client Manufacturer: Novell
Device: IPX/SPX-compatible Protocol
Manufacturer: Microsoft
Device: TCP/IP
Manufacturer: Microsoft
Device: Fast Infrared Protocol
Manufacturer: Microsoft
NETWORK CLIENTS:
  Device: Novell NetWare Client
  Manufacturer: Novell
NETWORK SERVICES:
  Device: Microsoft SNMP agent
  Manufacturer: Microsoft
PCMCIA SOCKET DEVICES:
  Device: Texas Instruments PCI-1311 CardBus Controller
  Manufacturer: Texas Instruments
  Revision: 001
PORTS:
  Device: ECP Printer Port (LPT1)
  Manufacturer: (Standard port types)
  Device: Communications Port (COM1)
  Manufacturer: (Standard port types)
  Device: Infrared Serial (COM) Port
  Manufacturer: Microsoft
  Device: Infrared Printing (LPT) Port
  Manufacturer: Microsoft
STORAGE:
  Device: Standard Floppy Disk Controller
  Manufacturer: (Standard floppy disk controllers)
  Device: Opti Viper Max Dual PCI IDE Controller
  Manufacturer: Opti
  Revision: 048
  Device: Primary IDE controller (dual fifo)
  Manufacturer: (Standard hard disk drivers)
  Manufacturer: (Standard hard disk drivers)
  Device: MATSHITA UJDA120
  Manufacturer: MATSHITA
  Device: GENERIC IDE DISK TYPE65
  Manufacturer: GENERIC
  Device: GENERIC NEC FLOPPY DISK
  Manufacturer: GENERIC
PRINTERS:
  Device: HP LaserJet 5N
  Manufacturer: HP
  Device: IBM Proprinter
  Manufacturer: IBM
UNIVERSAL SERIAL BUS:
  Device: Compaq PCI to USB Open Host Controller
  Manufacturer: Compaq
  Revision 006
  Device: USB Root Hub
  Manufacturer: (Standard USB Host Controller)
SYSTEM DEVICES:
  Device: Plug and Play Software Device Enumerator
  Manufacturer: Microsoft
  Device: Plug and Play BIOS
  Manufacturer: (Standard system devices)
  Device: System board
  Manufacturer: (Standard system devices)
  Device: Advanced Power Management support
  Manufacturer: (Standard system devices)
  Device: System board extension for PnP BIOS
  Manufacturer: (Standard system devices)
  Device: Numeric data processor
  Manufacturer: (Standard system devices)
  Device: Programmable interrupt controller
  Manufacturer: (Standard system devices)
  Device: System timer
  Manufacturer: (Standard system devices)
  Device: Direct memory access controller
  Manufacturer: (Standard system devices)
  Device: System speaker
  Manufacturer: (Standard system devices)
  Device: System CMOS/real time clock
  Manufacturer: (Standard system devices)
  Manufacturer: (Standard system devices)
  Device: Motherboard resources
  Manufacturer: (Standard system devices)
  Device: IRQ Holder for PCI Steering
  Manufacturer: (Standard system devices)
  Device: Opti FireStar CPU to PCI bridge
  Manufacturer: Opti
  Revision: 050
  Device: Opti Firestar PCI to ISA Plug and Play bridge
  Manufacturer: Opti
  Revision: 049
  Device: IO read data port for ISA Plug and Play enumerator
  Manufacturer: (Standard system devices)
  Device: Composite Power Source
  Manufacturer: (Standard system devices)
  Device: APM Battery Slot
  Manufacturer: (Standard system devices)

The results of the inventory process in block 86 may be submitted to operations center 12 to be stored in a device item table 70 portion of database 60. In the disclosed embodiment, the results of the inventory process may be optionally submitted to operations center 12. The stored results of the inventory process may be used to allow operations center 12 to assist administrators and users in tracking changes and updates to the hardware or installed software associated with device 30, for example, by generating a report of all the component changes to device 30.

Figure 3:
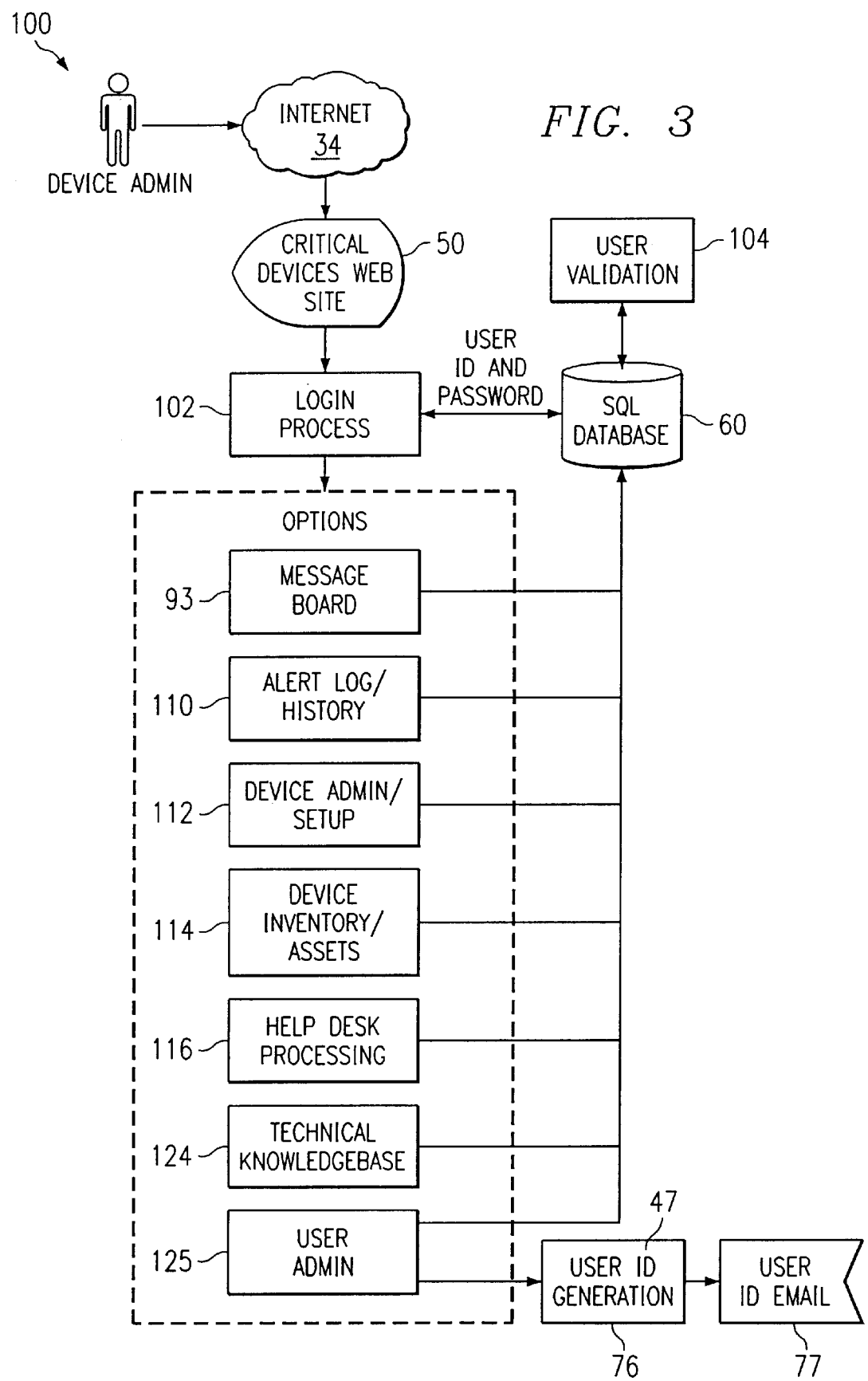
FIG. 3 is a flow diagram showing details of the processing and administrative functionality available to a device administrator utilizing the present invention.

FIG. 3 is a flow diagram showing a detail of the processing and administrative functionality available to device administrator 100. Device administrator 100 is responsible for administering one or more specific devices 30. Each device 30 may have one or more device administrators 100 associated therewith. Device administrator 100 communicates over Internet 34 to access website 50. In the disclosed embodiment, website 50 is a website comprising one or more web pages stored on a web server operated by Critical Devices, Inc., the assignee of the present invention. Website 50 may also be operated by other suitable entities who are capable of providing remote device monitoring service 10 according to the present invention. After device administrator 100 has contacted website 50, a login process 102 begins. User identifier 47 of device administrator 100 and the password associated with that user identifier 47 are supplied by device administrator 100. The user identifier 47 and password are then submitted to a user validator process 104.

User validator 104 is a process that accesses database 60 to validate the user identifier 47 and password. User validator 104 may use any suitable security technology to validate user identifier 47. For example, user identifier 47 and the associated password may be stored in database 60 and user validator may search database 60 for user identifier 47 and the password. If the user identifier 47 or password are invalid, then user validator 104 will return an error and device administrator 100 will be denied access to system 10. If user identifier 47 is valid, then device administrator 100 is logged into system 10.

Once device administrator 100 has logged in, device administrator 100 is presented with a plurality of options which may include viewing an alert log and history 110, performing device administration tasks 112 for device 30 which the device administrator 100 is the administrator, a process for viewing and modifying device inventory and assets 114, utilizing a technical support service 116, accessing a technical knowledge base 124, and performing user administration 125.

Alert log and history 110 provide device administrator 100 with a list of the current and past alerts that have been generated by agents 81 on respective devices 30 associated with device administrator 100. Device administrator 100 may also perform device administration tasks 112 which includes setup configuration and other functions associated with device 30. The device administration functions will vary based on the type of device 30 which the device administrator 100 administers. For example, a server device has different administration and setup options than a workstation or a network postage meter. Device inventory and assets process 114 may be used to view and modify the hardware and software list associated with device 30 and stored in database 60. In the disclosed embodiment, device inventory and assets process 114 stores the information in device item table 70 (FIG. 2).

Technical support service 116 allows device administrator 100 to submit a problem with device 30, the question regarding the operation of device 30, or other issues related to device 30 which the device administrator administers. Technical support service 116 is described in more detail in association with FIGS. 7 through 9. Technical support service 116 is one embodiment of a technical support system that may encompass an entire organization or site that may be in a single or in multiple geographic locations. The technical support system encompasses more than a group of people who wait and react to problems. The technical support system may provide services in addition to those of technical support service 116, such as full proactive and reactive technical support by utilizing the components described in association with technical support service 116 in FIGS. 7–9.

Device administrator 100 may also access message board 93. Message board 93 provides notification of system updates and upgrades and also provides a forum for any and all feedback, such as approvals and denials, required from device administrator 100, site administrator 140, or other users. Message board 93 may also be used by resellers in order to communicate and provide approvals and denials of invoices between operations center 12 and users.

Device administrator 100 may also access technical knowledge base 124 stored on database 60. Technical knowledge base 124 may contain information, technical bulletins, frequently asked questions, and other technical or training information that may be useful to device administrator 100. For example, technical knowledge base 124 may be accessed by device administrator 100 in order to solve a particular problem the device administrator 100 is experiencing with the device administrator's associated device 30.

Device administrator 100 may also perform user administration 125. User administration 125 includes adding, viewing and modifying the access set, the password and other information associated with user identifier 47. The other information may comprise a name of user 45 associated with user identifier 47, an office location of user 45 associated with user identifier 47, and any other suitable user 45 related information. Device administrator 100, in the disclosed embodiment, is limited to changing the password and other information associated with user identifier 47 of device administrator 100. A new user identifier 47 may also be generated at block 76 for user 45 of device 30. For example, the new user identifier 47 may be user 45 who will be device administrator 100 for one or more devices 30. At block 77, user 45 who has been associated with a new user identifier 47 may be notified of the new user identifier 47. User 45 may be notified via electronic mail and message board 93.

Figure 4:
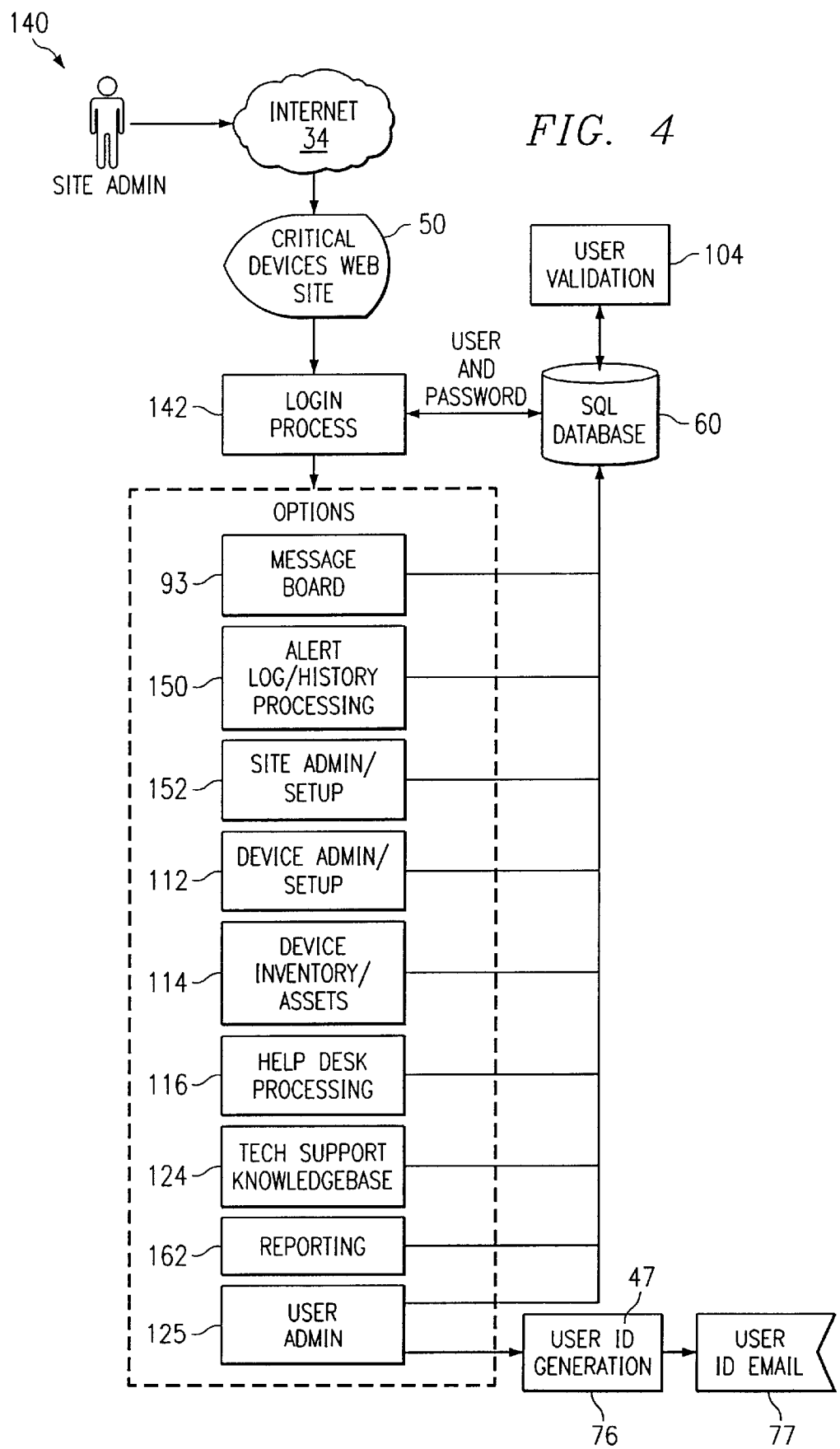
FIG. 4 is a flow diagram showing details of the processing of administrative functionality available to a site administrator according to the present invention.

FIG. 4 is a flow diagram showing details of the process and administrative functionality available to site administrator 140. Site administrator 140 may be responsible for one site 14 or multiple sites 14 in a site family 24. Site administrator 140 accesses website 50 over Internet 34. Website 50 is a website comprising one or more web pages stored on a web server operated by Critical Devices, Inc., the assignee of the present invention. Website 50 may also be operated by other suitable entities who are capable of providing remote device monitoring service 10 according to the present invention. Site administrator 140 logs into remote device monitoring system 10 by supplying user identifier 47 of site administrator 140 and the password associated with user identifier 47. The user identifier 47 and password are submitted to operations center 12 where they are validated against the user identifier 47 and password stored in database 60 using user validator 104. Once the security access of site administrator 140 has been verified, site administrator 140 is presented with a plurality of options which may include viewing site alert log and history 150, performing site administration 152, performing device administration 112, viewing and updating device inventory and assets 114, utilizing technical support service 116, accessing message board 93, utilizing technical support knowledge base 124, performing user administration 125, and generating reports 162.

Site alert log and history 150 allow Site administrator 140 to view and modify alerts generated with respect to any devices 30 associated with site 14. Site administrator 140 may also perform site administration tasks 152, such as adding or removing devices 30 from site 14 and requesting more or fewer licenses for devices 30 at site 14 in order to accommodate equipment changes at site 14. Site administrator 140 may also be responsible for administering site family 24, for example, by adding and removing sites 14 and devices 30 from site family 24. Site administrator 140 also has access to device inventory and assets 114 for every device 30 in site 14 which site administrator 140 administers and has access to functionality similar to that of device administrator 100. Site administrator 140 also has access to technical support service 116. Site administrator 140 may also access technical support knowledge base 124.

In addition, site administrator 140 may request and generate reports 162. Site administrator 140 may generate reports 162 incorporating any of the information available to site family 140 as part of the site alert log and history 150, the performance of site administration 152 and device administration 112, and the device inventory and assets 114. Reports 162 may be customized by site administrator 140 to incorporate any or all of the information available to site administrator 140.

Site administrator 140 may also perform user administration 125. site administrator 140 may freely add and delete user identifiers 47 and modify existing user identifiers 47. Site administrator may change any of the access set, passwords and other information associated with any user identifier 47 associated with site 14 which site administrator 125 administers.

Figure 5:
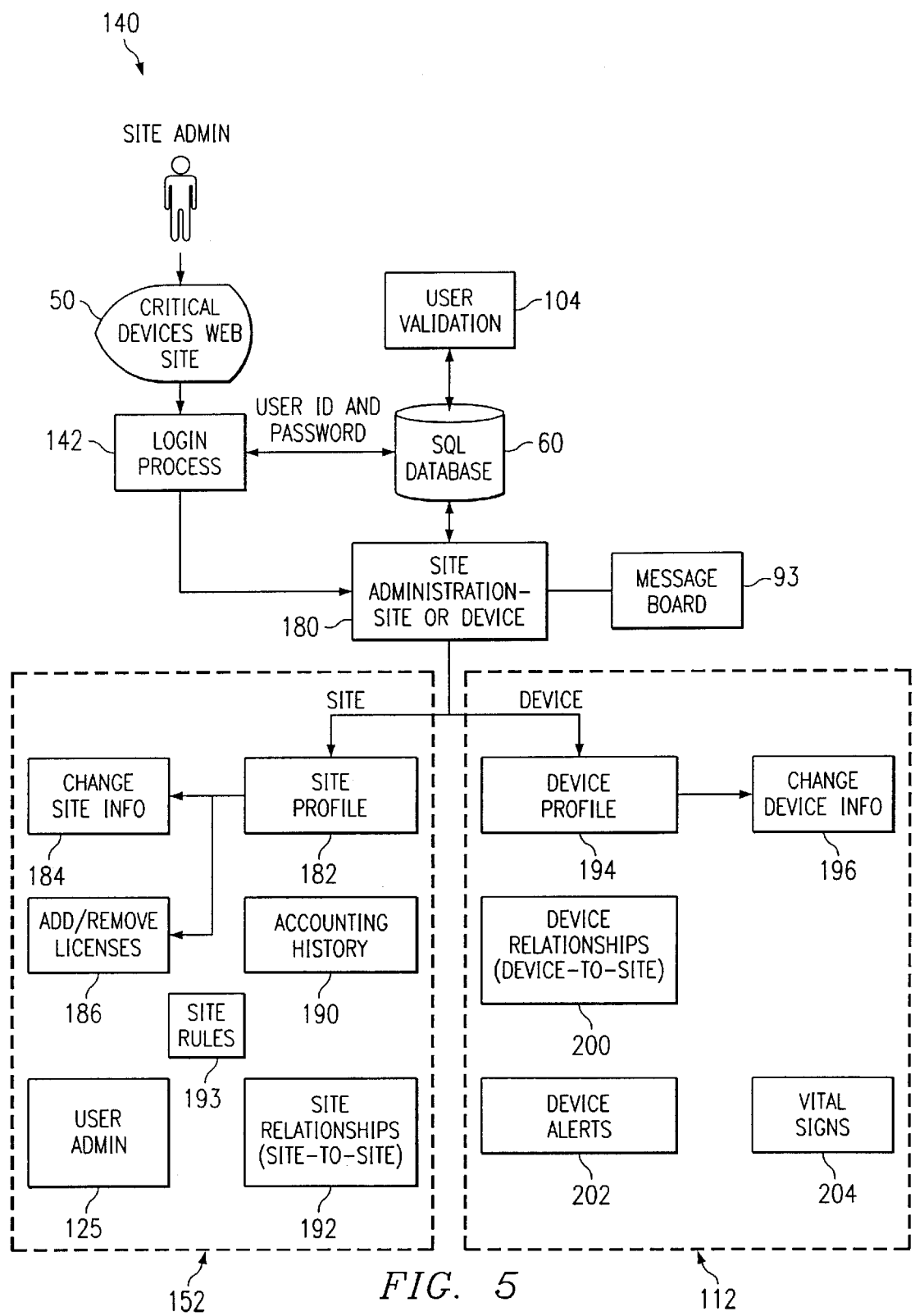
FIG. 5 is a flow diagram showing details of site and device administration processes of the present invention.

FIG. 5 is a flow diagram showing details of the site and device administration process of the present invention. Site administrator 140 accesses website 50 and begins login process 142 in order to log in as the site administrator. Login process 142 passes the user identifier 47 and password of site administrator 140 to database 60 at operations center 12 for validation. The user identifier 47 and password are validated by user validator 104. Once site administrator 140 has been validated, site administrator 140 is allowed to log in. At block 180 site administrator 140 may choose to perform site administration tasks 152 for site 14 or device administration tasks 112 for any of devices 30 in site 14 administered by site administrator 140.

In particular, if site administrator 140 chooses to perform site administration tasks 152, then site administrator 140 may perform user administration 125, change the site profile at block 182, examine an accounting history 190, and view and modify site-to-site relationships in block 192. Changing the site profile at block 182 may include changing the site information at block 184, adding licenses at block 186, or changing the passwords associated with devices 30 associated with site 14 or changing the site password itself at block 188. In the disclosed embodiment, changing the site information at block 184 includes changing the site information submitted in block 54 and stored in the site table 64 (FIG. 2). At block 186, site administrator 140 may add or remove licenses for devices 30 associated with site 14 which site administrator 140 administers. Site administrator 140 may also change site or device passwords at block 188 for sites 14 and devices 30 which site administrator 140 administers. Site administrator 140 may also view accounting history 190 which provides a breakdown of the various charges that have been assessed by operations center 12 with respect to site 14 or site family 24 which site administrator 140 administers. Site administrator 140 may also modify site-to-site relationships 192, for example, by removing sites 14 from site family 24. At block 193 the site administrator may modify any the SNMP rules 1006 (see FIG. 14), web rules 1106 (see FIG. 15) and device sentinel rules 1206 (see FIG. 16).

Site administrator 140 may also perform device administration 112 on any device 30 associated with site 14 which site administrator 140 administers. In particular, site administrator 140 may change the device profile at block 194 or device-to-site relationships at block 200. Changing device profile 194 may include changing the device information at block 196 which involves changing the device information submitted as part of the device information form at block 72 and the information in device table 66 (FIG. 2). Site administrator 140 may also change the device-to-site relationships at block 200 by, for example, moving a particular device 30 from one site 18 in site family 24 to another site 20 in site family 24. Site administrator 140 may also access and administer message board 93.

Figure 6:
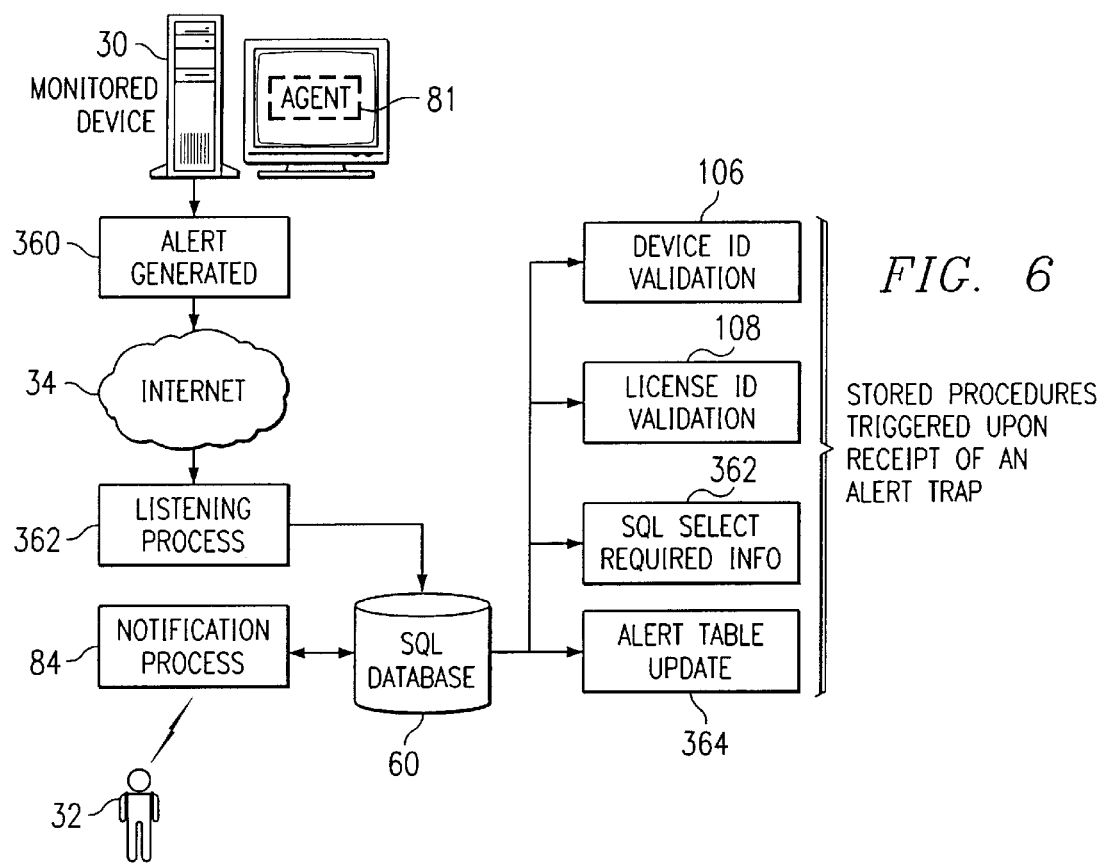
FIG. 6 is a flow diagram showing details of the generation and processing of an alert utilizing the present invention.

FIG. 6 is a flow diagram showing details of the generation and processing of an alert for device 30. Agent 81 associated with device 30 operates to monitor various health-indicative operating parameters associated with each device 30. The operation of agent 81 is described in more detail in FIG. 6A. When one of the health-indicative parameters exceeds a predetermined threshold or value indicative of poor health, or indicating a high likelihood of poor health or failure, agent 81 generates an alert in block 360. The alert includes the device identifier and MAC address of device 30 which is generating the alert. The alert also includes version information associated with agent 81 so that operations center 12 may notify the user that a new version of agent 81 is available. The alert is then transmitted over Internet 34 by agent 81 to a listening process 362. In one embodiment, agent 81 is operable only to transmit information outbound from the device 30 and provides no support for receiving inbound information or connections. By allowing agent 81 to only transmit outbound information, greater security is maintained for device 30 and site 14 as no additional entry points are provided for exploitation by hackers and intruders. In another embodiment, agent 81 is operable to both send and receive information over Internet 34. When agent 81 is operable to both send and receive information over Internet 34, agent 81 may encrypt the information to be communicated over Internet 34 and/or may communicate using a secure or encrypted channel over Internet 34.

Listening process 362, in the disclosed embodiment, is located at operations center 12 and operates to receive alerts generated by any of the plurality of deployed agents 81. Listening process 362 may also receive alerts generated by third-party agents other than agent 81 and may do so by defining a Simple Network Management Protocol (SNMP) Management Information Base (MIB) for the third-party agent. Listening process 362 may be a multi-threaded program that process the data contained in the alert. Listening process 362 will verify device identifier and license identifier information in the received alert against stored device identifiers and license identifier in database 60. Listening process 362 verifies the device identifier and license identifier in the alert to ensure that the alert is from a valid and active device 30. If the device identifier and license identifier are not found in database 60 or are inactive, then listening process 362 will discard the alert.

In particular, listening process 362 may format the data into an appropriate text string that may be passed to notification process 84 for further processing. In particular, listening process 362 stores the alert in database 60 in a pending notifications table (not shown) which notification process 84 continually polls for work to do. Notification process 84 queries database 60 based on the received alert so that device 30 from which the alert has been received may be validated, retrieves the required information for notification of contact 32 and records the received alert in database 60. In particular, the device identifier associated with device 30 and the license identifier associated with device 30 from which the alert is received are validated by a device validator 106 and a license validator 108.

Device validator 106 validates the device identifier supplied with the alert. Device validator 106 validates the device identifier by finding the device identifier in device table 66. If the device identifier is found in device table 66 and the device identifier is not inactive for some reason, such as being behind on paying for the monitoring service, device validator 106 will report that the device identifier is valid and allow the alert to be processed by license validator 108. If the device identifier is not found in device table 66, for example, if the device identifier is a false or fraudulent device identifier, then the device validator 106 will abort the processing of the alert by operations center 12.

License validator 108 validates the license identifier supplied with the alert. License validator 108 validates the license identifier by finding the device identifier in license table 62. If the license identifier is found in license table 62 and the license identifier is not inactive for some reason, such as being behind on paying for the monitoring service, license validator 108 will report that the license identifier is valid and allow the alert to be processed by notification process 84. If the license identifier is not found in license table 62, for example, if the license identifier is a false or fraudulent license identifier, then the license validator 108 will abort the processing of the alert by operations center 12.

In addition, notification process 84 retrieves any required information associated with the alert at block 362 from the database 60 and updates alert table 68, as shown in block 364. Once notification process 84 has retrieved information from block 362, validated the device identifier and license identifiers and processed the alert, the notification process 84 notifies contact 32 of the alert. Notification process 84 may use, in the disclosed embodiment, electronic mail, a phone, a pager, or a fax to notify contact 32. For example, if notification process 84 is using electronic mail or a fax, notification process 84 may send a detailed description of device 30 for which the alert has been generated and if notification process 84 is using a pager to notify contact 32, notification process 84 may send a page using a particular identifying number followed by the device identifier of device 30 and a numeric value representing the alert. Contact 32 may then handle the alert by taking appropriate actions in response to the alert.

Figure 6A:
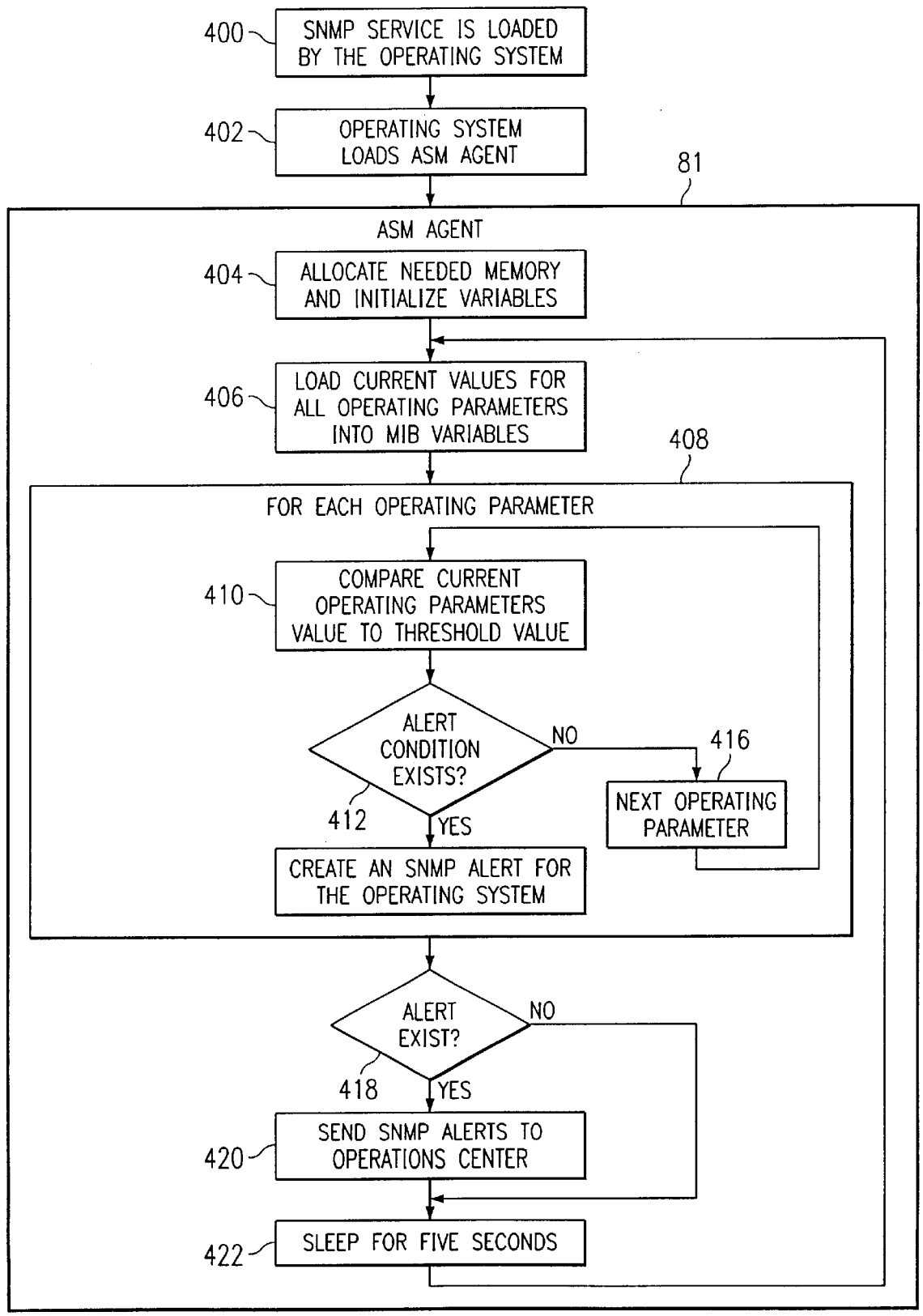
FIG. 6A is a flow chart showing the operation of the agent.

FIG. 6A is a flow chart showing the operation of the agent. Agent 81, in one embodiment, may use the SNMP network management protocol which is well-known in the industry. At block 400, the SNMP service is loaded by the operating system. In block 402, the operating system associated with device 30 loads agent 81 into the memory of device 30 for execution.

At block 404, agent 81 performs set up and initialization procedures such as allocating needed memory and initializing variables. At block 406, agent 81 loads current values for all indicators, such as the health indicative operating parameters previously described, into MIB variables for use with SNMP.

At block 408, agent 81 performs blocks 410, 412, 414, and 416 for each health indicative operating parameter. At block 410, the current operating parameter is examined to determine its current value on device 30 and is compared to a threshold value. The SNMP alerts may be transmitted to operations center 12 using the universal diagram protocol (UDP). At block 412, an alert is generated if the current value of the current operating parameter is outside the threshold values or other values within which the current operating parameter is expected to operate. If the current operating parameter is outside of its allowed operational range, then the YES path of decisional step 412 is followed and an SNMP alert is created for the current operating parameter in block 414. The SNMP alert may include an SNMP variable binding list containing the appropriate MIB variables associated with the operating parameter, the MAC address of device 30 and the device identifier associated with device 30. If the current operating parameter has not exceeded its allowed operational range, then the NO branch of decisional step 412 will be followed to block 416. At block 416, the next operational parameter is set as the current operational parameter and the method returns to block 410.

Once each operating parameter has been examined in block 408, the method proceeds to decisional step 418. At decisional step 418, a check is made to see if any SNMP traps have been created in block 414. If any traps have been generated, then the YES branch of decisional step 418 is followed to block 420 where the generated traps are treated as alerts and sent to operations center 12. If no traps have been generated in block 414, then the NO branch of decisional step 418 is followed to block 422. At block 422, agent 81 may sleep for a predetermined period of time, such as five seconds, and then continue to step 406 to again check the current values of each operating parameter on device 30. The method proceeds until agent 81 is terminated, such as at system shutdown.

Figure 7:
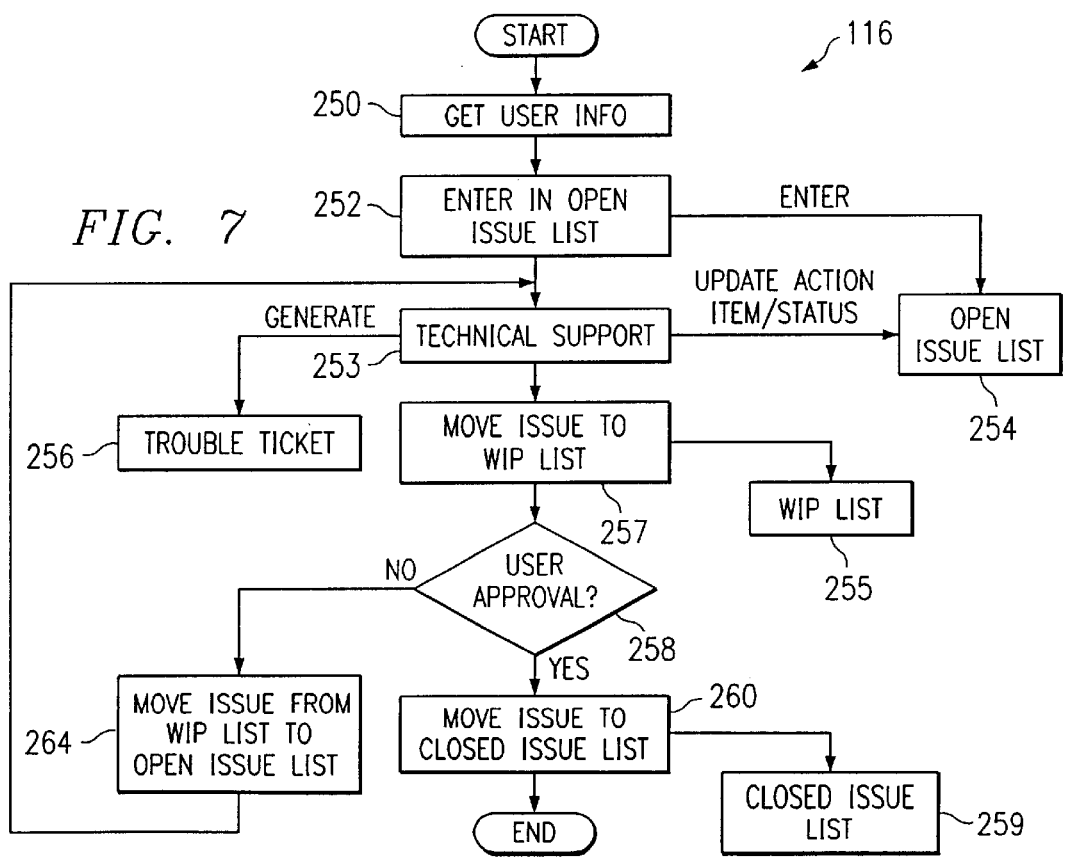
FIG. 7 is an exemplary flowchart showing details of the processing performed by the technical support service utilizing the present invention.

FIG. 7 is an exemplary flow chart of the processing performed by the technical support service. When site administrator 140 or device administrator 100 accesses technical support service option 116, the technical support service 116 will begin processing at step 250 by requesting specific information from the user. The users of technical support service 116 may include site administrator 140, device administrator 100 or other users. For example, technical support service 116 may request following information:

Category:
    Hardware
    Software
    Communications
    Other
Action:
    Install
    Upgrade
    Replace
    Repair
    Performance
    Other
Component: Drop Down list with possible components.
Typically, these should be relevant for the Category selected above.
Severity: (1 to 5 with 1 the most severe)
Issue Description:
Is this preventing you from completing your daily responsibilities? (Y/N)

Any other suitable information may be requested from the user in order to more effectively provide help or support to the user with respect to their problem. Then, at step 252, the technical support service creates an open issue with the user's information and enters the newly created open issue in an open issue list, queue or record 254. When a problem is in the open issue list 254, the attention of a support technician or other designated personnel is required, as shown in block 253. The support technician (not shown) may enter, add, modify, update or delete one or more action items and status information associated with each respective open issue in open issue list 254. The action items and status information may include, for example, equipment that has been ordered in order to complete repairs and an expected arrival date, percentage completion of the open issue, actions taken in order to resolve the open issue and any other suitable information relating to the open issue. The support technician may also generate a trouble ticket 256 for any open issue. In the disclosed embodiment, the trouble ticket may be a hardcopy version of the status information and action items, and may include other information related to the open issue. After the support technician believes an open issue to be resolved, the open issue is transferred to a work-in-progress list 255 at block 257. The user or device administrator 100 is notified that the open issue has been transferred to the work-in-progress list 255. In the disclosed embodiment, the user or device administrator 100 may be notified by any suitable method such as by an electronic mail, a phone call, a fax or a pager. Once the open issue has been transferred to the work-in-progress list 255, the open issue must be approved by the user or device administrator 100 of that device 30 before the open issue may be closed.

In decisional block 258, the user may indicate approval or disapproval of closing the matter. In the disclosed embodiment, the user's approval is based on the resolution of the issue by the support technician. If the user approves of the resolution of the problem by the support technician, the issue is, as shown in block 260, marked as closed and moved to a closed issue list 259. Closed issue list 259 may contain all of the action items and status information associated with the open issue as well as any comments made by the user during the approval process. If the user does not agree that the issue has been resolved by the support technician, the user may disapprove closing the issue, and the issue is moved from work-in-progress list 255 back to open issue list 254 so that the support technician can continue addressing the problem. It may be seen that any matter will not reach a conclusion until the user is satisfied with the manner in which the problem is resolved.

Figure 8:
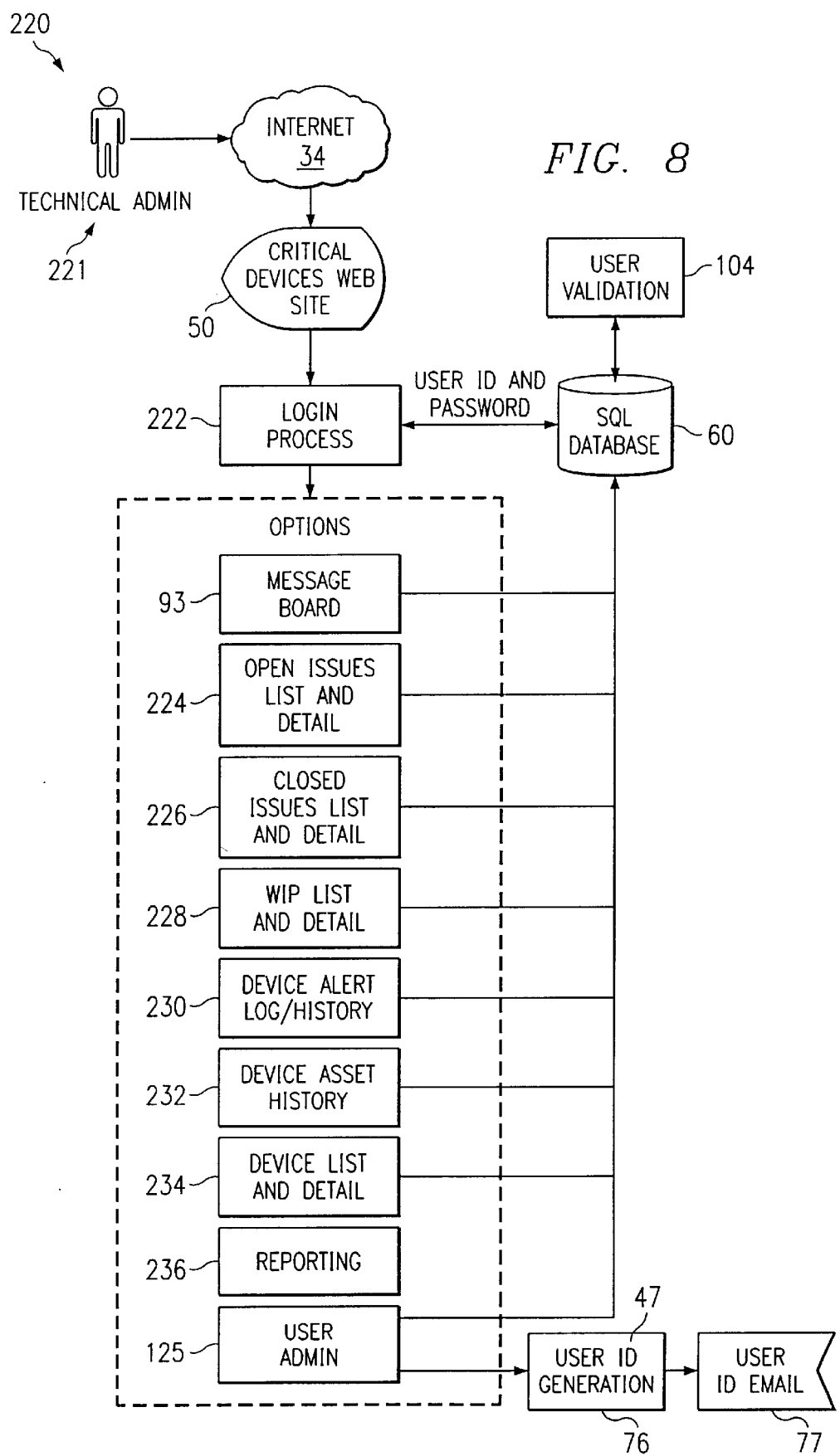
FIG. 8 is a flow diagram showing details of the resolution of an open issue and an open issue list utilizing the present invention.

FIG. 8 is a flow diagram showing details of the resolution of an open issue in the open issue list. Technical administrator 220 and technician 221 may connect to website 50 over Internet 34. Technical administrator 220 logs in at block 222 by providing the technical administrator's user identifier 47 and password. The user identifier 47 of technical administrator 220 will then be validated by user validator 104. Once technical administrator 220 has been validated, technical administrator 220 will be allowed to log in and may be presented with a plurality of options. The options include accessing open issue list 224, accessing the message board 93, closed issue list 226, work-in-progress list 228, a device alert log and history 230, a device asset history 232, a device list 234 with associated details, and a report generator 236.

Technical administrator 220 may view any of the open issues in open issue list 224 and view and update details and information associated with each open issue. In the disclosed embodiment, technical administrator 220 updates a selected open issue with action items and status information regarding the resolution of the selected open issue. Technical administrator 220 may also view closed issue list 226 and any details associated with the closed issues, such as user comments regarding the resolution of the open issue when the user approved the open issue for closing. Work-in-progress list 228 and associated details provide technical administrator 220 with information regarding which open issues have been resolved by technical administrator 220, by other technical administrators, or by technical support personnel, that are awaiting user approval. Device alert log and history 230 provides a list of current and past alerts generated by each device 30 which has an open issue associated with it. Similarly, device asset history 232 will list hardware changes and information associated with each device 30 which has an open issue associated with it. The device alert log and history 230 and device asset history 232 may be used by technical administrator 220 in order to more efficiently resolve the open issue. Device list 234 and associated details provide the technical administrator with a list of all devices having open issues in the open issue list. Technical administrator 220 may also generate a variety of reports using report generator 236. The reports may include, for example, any of the information available to the technical administrator such as that in open issue list 224, closed issue list 226, work-in-progress list 228, device alert log and history 230, device asset history 232 and device list 234.

Technical administrator 220 may assign one or more technicians 221 to work on any of the open issues in open issue list 224 and work-in-progress list 228, and closed issues in closed issue list 226. Technicians 221 are similar to technical administrators 220, but are limited in their access to open issue list 224, closed issue list 226, work-in-progress list 228, device alert log and history 230, device asset history 232 and device list 234. Specifically, technicians 221 may only access open issues and closed issues that have been assigned to them by technical administrator and have read-only access to device alert log and history 230, device asset history 232 and device list 234. Technicians 221 may alternatively have more limited access and may have read-only access to open and closed issues which are assigned to technician 221 and vital signs of device 30 associated with the open and closed issues.

Figure 9:
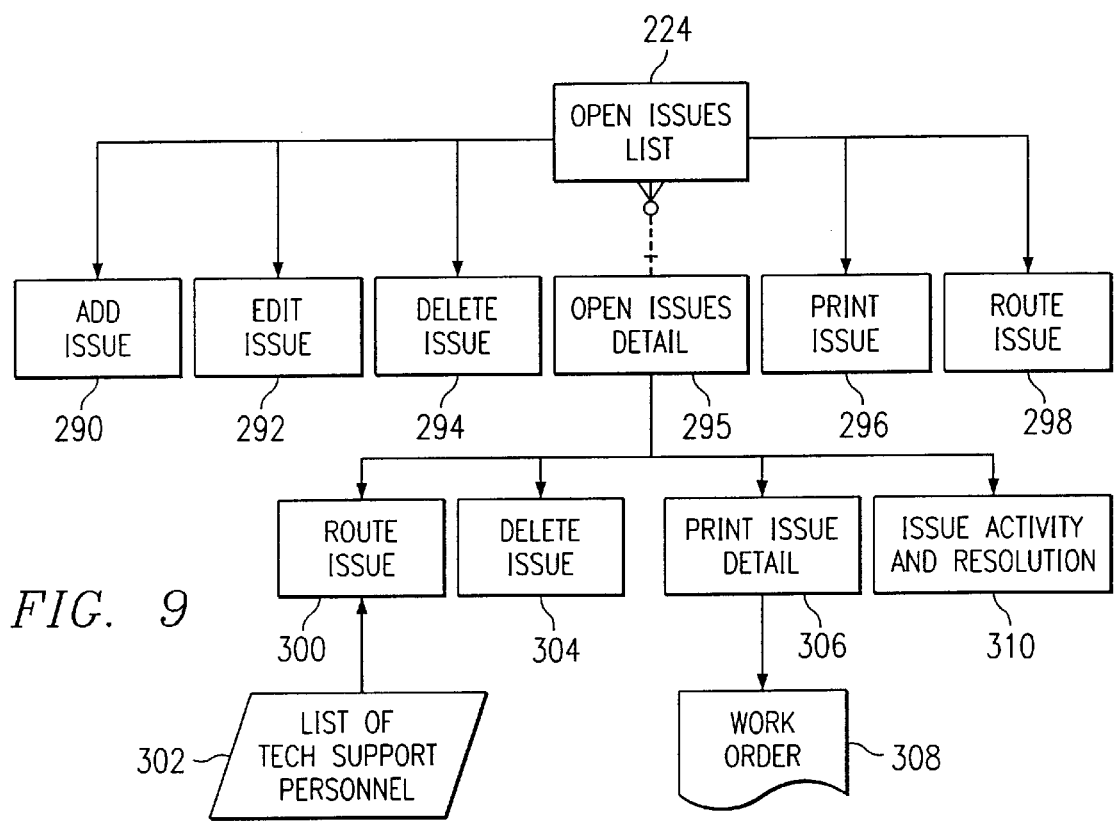
FIG. 9 is a flow diagram showing details of functionality associated with an open issue list utilizing the present invention.

FIG. 9 is a flow diagram showing details of functionality associated with open issue list 224. Open issue list 224 includes an add issue functionality 290, an edit issue functionality 292, a delete issue functionality 294, a print issue functionality 296, and an issue routing functionality 298. Access to certain details 295 associated with the open issue list 224 is also provided. Issue routing functionality 298 further allows technical administrator 220 to route the open issue to appropriate support personnel.

Open issue details functionality 295 includes issue routing information 300, issue delete functionality 304, print detail functionality 306, and issue activity and resolution status 310. Issue routing information 300 may utilize a list of technical support personnel 302 in order to provide and track the recipient of an open issue routed to the recipient by technical administrator 220. Print detail functionality 306 may be used to generate a detailed work order 308 which, in the disclosed embodiment, is a hard copy with includes the open issue and the details associated with the open issue. Issue activity and resolution information 310 may include status information and action items related to the resolution of the open issue by technical administrator 220 or by support personnel.

Figure 10:
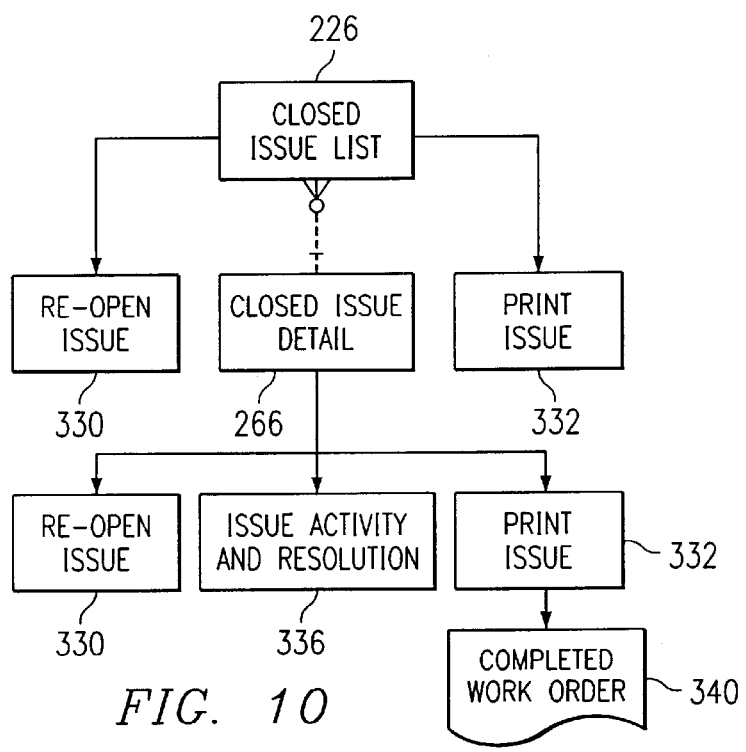
FIG. 10 is a flow diagram showing details of functionality associated with a closed issue list utilizing the present invention.

FIG. 10 is a flow diagram showing details of functionality associated with the closed issue list. The closed issue list functionality includes reopen issue functionality 330, print closed issue functionality 332, and closed issue details 266. Reopen issue functionality 333 provides technical administrator 220 the ability to remove a selected open issue from work-in-progress list 228 and place it back in open issue list 224 or move the selected open issue to the closed issue list. Print issue functionality 332 allows technical administrator 220 to print a closed issue and information in closed issue detail 266 to a hard copy. Print issue functionality 332 also allows technical administrator 220 to generate a completed work order 340. In the disclosed embodiment, completed work order 340 is a hard copy representation of the closed issue and closed issue detail 266.

Closed issue detail 266 includes the reopen issue functionality 330, issue activity and resolution functionality 336, and print issue functionality 332. Issue activity and resolution information 336 may include action items and status information regarding the resolution of the closed issue. In addition, issue activity and resolution information 336 may include user comments provided in association with the approval of the closing of the open issue by the user as described in FIG. 7.

Figure 11:
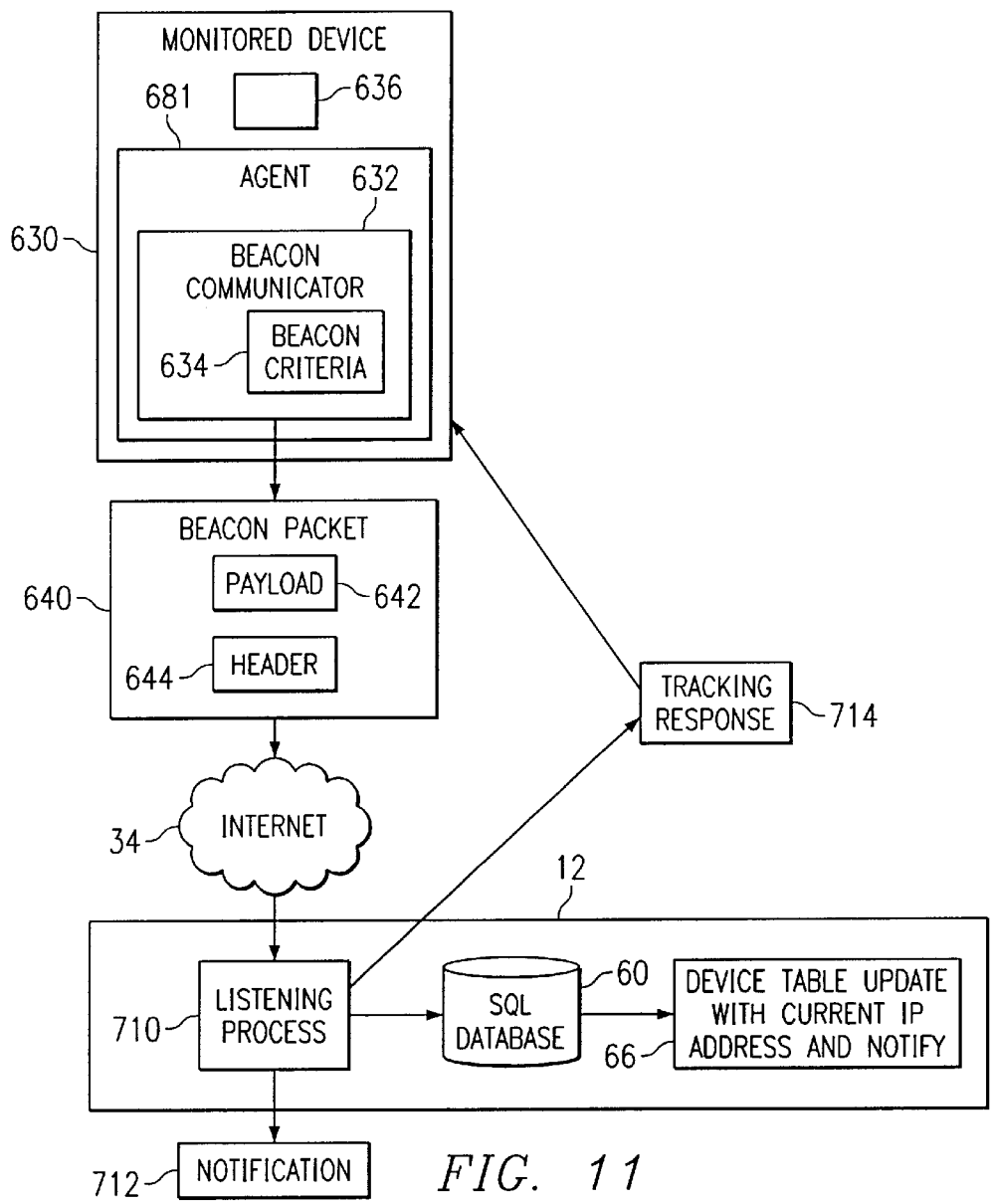
FIG. 11 is a block diagram illustrating one embodiment of the system of FIG. 1 for tracking one or more monitored devices.

FIG. 11 is a block diagram illustrating one embodiment of system 10 for tracking one or more monitored devices 630. In this embodiment, system 10 further provides the ability to assist an administrator, such as device administrator 100 and site administrator 140, in tracking monitored devices 630. Each device 630 comprises any object having an associated network address or other electronically accessible address. Device 630 is optionally capable of bi-directional communication, specifically, the capability to transmit data and receive data. For example, device 630 may comprise a box with an electronically readable tag, a personal digital assistant (PDA), a cellular phone, a general purpose or specialized computer system, and other electronic devices having simple or advanced data processing capabilities. Device 630 further comprises a beacon communicator 632 and a seed application 636 as portions of agent 681. It should be noted that in one embodiment monitored device 630 may also be referred to as a target device before seed application 636 has actived agent 681 (as described in more detail in association with FIG. 11B) as "monitoring" of device 630 may not begin until after seed application 636 has activated agent 681. However, device 630 is consistently referred to as a "monitored" device for increased clarity hereafter.

Beacon communicator 632 comprises a software application executing on device 630 and operable to communicate with operations center 12 and to generate a beacon packet 640. Beacon communicator 632 further comprises beacon criteria 634. In the disclosed embodiment, beacon communicator 632 comprises an operating system extension. Alternatively, beacon communicator 632 may comprise any suitable combination of hardware and software, either alone or in combination, for supporting communication of device 630 with operations center 12 and may be created using any suitable programming language, such C, C++ and Java.

Beacon criteria 634 comprises a plurality of configurable parameters which indicate when beacon communicator 632 is to communicate data to operations center 12. In the disclosed embodiment, beacon criteria 634 indicates that beacon packet 640 is to be generated when device 630 is first activated. Alternatively, beacon criteria 634 may indicate that beacon packet 640 be generated at shutdown or at periodic intervals, such as every minute, every hour and once a day, while device 630 is activated. In addition, beacon criteria 634 may interact with power management and software power control features associated with device 630, such as when device 630 is a Personal Digital Assistant (PDA), for example, a PalmPilot by 3Com Corporation, to activate device 630 without user intervention to generate beacon packet 640. For example, a Palm VII wireless PDA by 3Com Corporation could be instructed to automatically activate every day at midnight and transmit location information so that the Palm VII can be tracked by a corporate asset management system. Beacon criteria 634 also indicates whether device 630 is configured for bi-directional or unidirectional communication.

Seed application 636 comprises a software application executing on device 630 for generating a device identifier associated with device 630 and activating agent 681 once device 630 is registered and licensed. The generating of the device identifier and the activation of agent 681 is described in more detail in association with FIG. 11B.

Beacon packet 640 comprises a data packet generated by an agent 681, a payload portion 642 and a header portion 644. In the disclosed embodiment, beacon packet 640 is distinct from the previously described alerts and optionally supports bi-directional communication between device 630 and operations center 12. Specifically, bi-directional communication comprises transmitting beacon packet 640 from device 630 and receiving a response from operations center 12. Alternatively, the information included within beacon packet 640 may be communicated unidirectionally in the same general manner as the previously described alerts or as an integral part of the previously described alerts.

Payload portion 642 comprises a plurality of location indicators associated with device 630. In general, payload portion 642 comprises the data and information which communicator 632 is communicating to operations center 12. Payload portion 642 may optionally be encrypted for increased security. Payload portion 642 is encrypted as specified by beacon criteria 634.

Header portion 644 comprises routing and control information for use with internet 34 for communicating packet 640 to operations center 12. Header portion 644 may also include any suitable additional routing and control information.

Agent 681 comprises a software application or applet executing on device 630 and operable to collect information for beacon packet 640. Agent 681 is configurable by an administrator associated with device 630 to collect various information at various times. The intervals specified for agent 681 and criteria 634 may differ. For example, an administrator associated with device 630 may configure agent 681 to collect processing load information about device 630 every 10 seconds, but configure criteria 634 to indicate that beacon packet 640 be transmitted only once an hour in order to save bandwidth. The load information collected by agent 681 would then be sent in payload portion 642. Agent 681 is described in more detail in association with FIG. 11A.

Figure 11A:
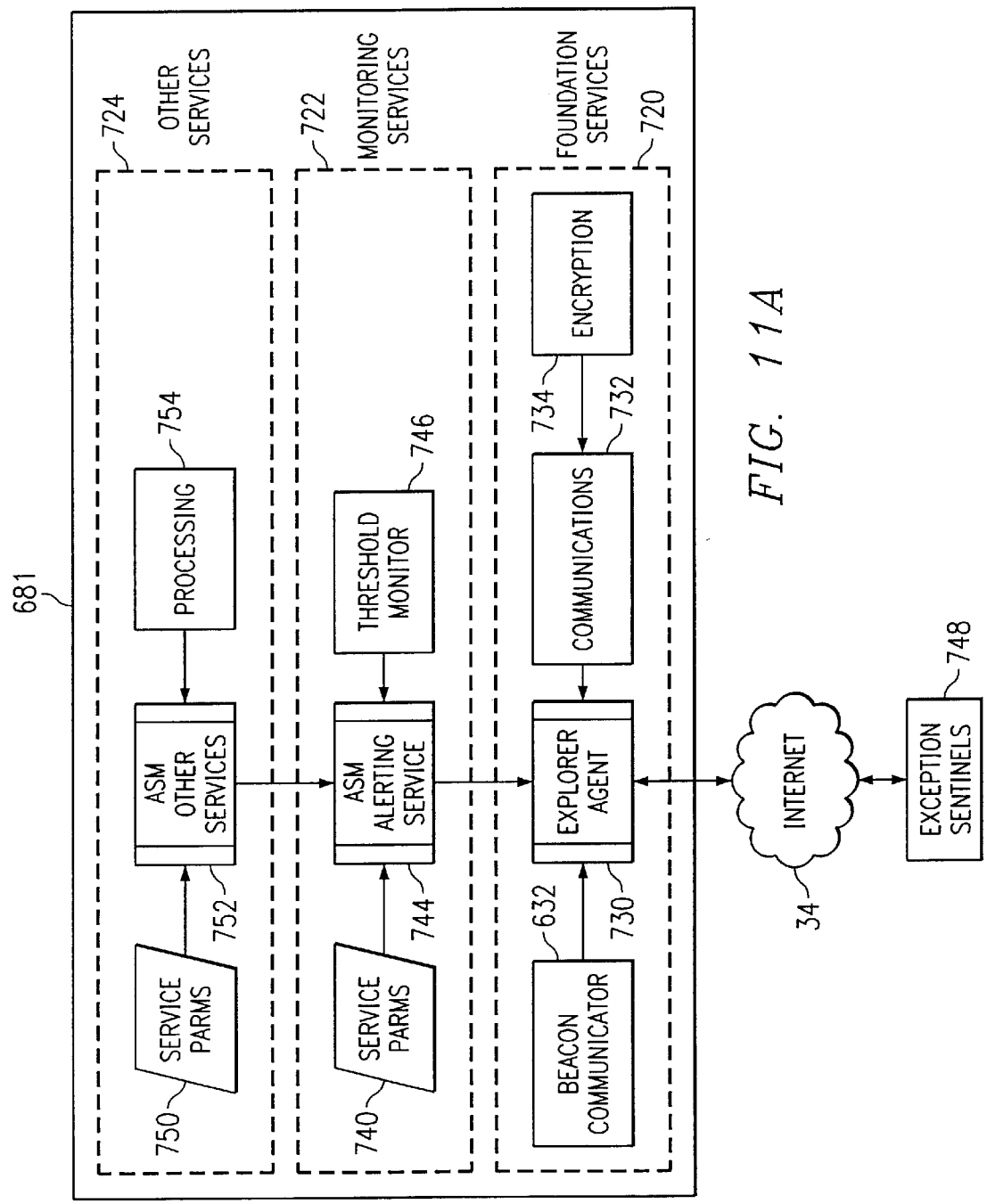
FIG. 11A is a block diagram illustrating details of an agent according to one embodiment of the present invention.
Figure 11B:
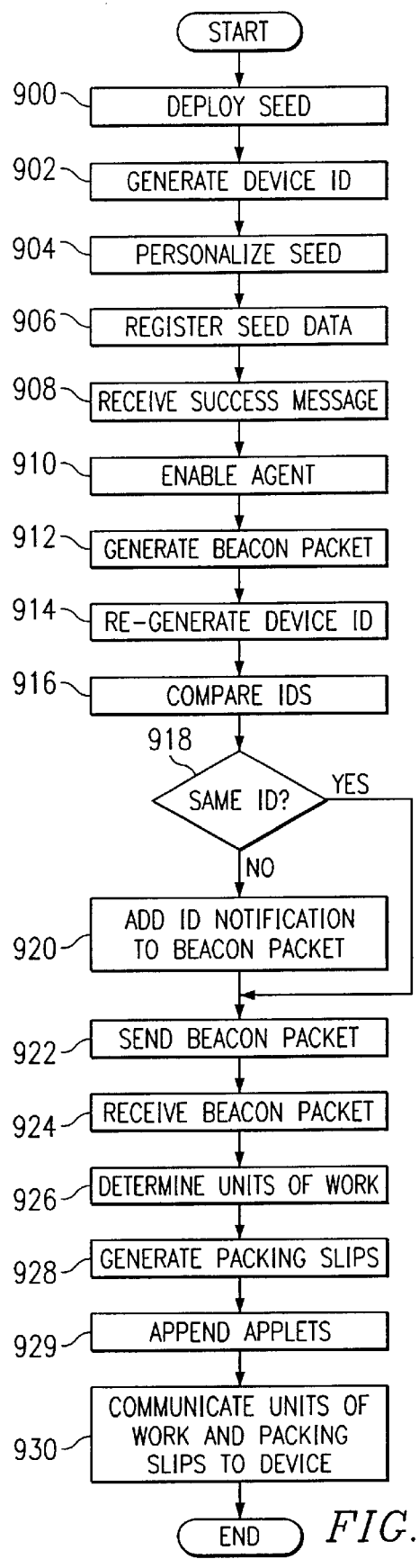
FIG. 11B is a flowchart illustrating a method for generating a device identifier for a particular monitored device and beaconing information to operations center from the particular monitored device according to one embodiment of the present invention.

In operation, seed 636 generates the device identifier to be associated with device 630 and gathers personalization information as described in FIG. 11B. The device identifier and personalization information are then communicated to operations center 12 and operations center 12 responds with a success message. The success message indicates that the device identifier and personalization information have been received at operations center 12 and that a valid license exists for device 630. Seed 636 then activates agent 681 in response to the success message. In one embodiment, devices 630 may be considered target devices rather than monitored devices as the monitoring may not begin until the agent 681 is enabled by seed 636.

Beacon communicator 632 then generates beacon packet 640 with the information collected by agent 681 stored in payload portion 642 of agent 681. In the disclosed embodiment, agent 681 collects a plurality of location indicators about device 630 at the same intervals as beacon criteria 634. The location indicators comprise the IP address of device 630, one or more IP addresses associated with the network to which device 630 is connected, the device identifier associated with device 630, and the version of agent 681 which generated beacon packet 640. Alternatively, the location indicators may comprise a cellular phone region and tower currently associated with device 630, such as when device 630 is a cellular device, or a ZIP code region associated with a wireless communications node, such as when device 630 is a Palm VII by 3Com Corporation. In general, any suitable location indicative information may be included in beacon packet 640, such as GPS information.

Then, beacon packet 640 is transmitted over Internet 34 to a device tracking listening process 710 at operations center 12. Listening process 710 comprises a software application executing on a computer system located at operations center 12 and is operable to receive and process beacon packets 640. Listening process 710 may alternatively be located remote from both operations center 12 and device 630. Process 710 is coupled to database 60. Process 710 queries database 60 to determine whether device 630 has been listed as stolen. Device table 66 is then updated with the current location indicators associated with device 630. In the disclosed embodiment, the IP address of device 630 and the addresses of the network to which device 630 is connected are stored and updated in device table 66. If the current location indicators associated with device 630 changes, such as a change in the IP address of device 630 or the addresses of the network to which device 630 is coupled, a location notification 712 is communicated to an appropriate handler with the location indicators associated with device 630. The handler comprises a person or automated process for receiving one or more notifications 712 and acting in response to the received notifications 712. For example, the person, such as site administrator 140 or device administrator 140, may take some action based on the new location of device 630. For another example, the automated process may store the current and previous locations of device 630 for inventory control and tracking purposes.

For security reasons, an administrator associated with device 630 may configure device 630 to be capable of only unidirectional, outbound communications. When device 630 is capable only of outbound communication, communicator 632 configures beacon packet 640 to not request a response from operations center 12 based on beacon criteria 634. When device 630 is capable of both outbound and inbound communication, communicator 632 configures beacon packet 640 to request a response from operations center 12 based on beacon criteria 634.

Location notification 712 comprises an electronic mail message, a pager, a phone, or a fax used to communicate with the administrator. Location notification 712 includes the location indicators associated with device 630. Notification 712 also includes any geographic location information which can be determined for device 630. For example, the IP address of device 630 or the IP addresses associated with the network to which device 630 is coupled may be used to determine a possible geographic area in which device 630 may be located. It should be noted however, that IP addresses often provide inaccurate geographic information or may provide no geographic information. One example of when IP addresses and addresses associated with the network to which device 630 is coupled do provide geographic location information occurs when device 630 is a package with an electronic identifier that is being moved from warehouse-to-warehouse. Each warehouse and delivery truck may have associated wireless or wireline based networks with known IP addresses. Thus, when device 630 is attached to a particular network, the warehouse or truck where device 630 is currently located can be tracked using notification 712. For another example, the cellular tower with which device 630 is communicating, when device 630 comprises a cellular device, may be used to narrow down the geographic area in which device 630 is located. For yet another example, Global Positioning System (GPS) information may be used if device 630 has such a system associated therewith.

Also, if device 630 is configured for bi-directional communication, operations center generates tracking response 714 to respond to beacon packet 640. Tracking response 714, in the disclosed embodiment, is used to provide agent 681 and communicator 632 with software updates. For example, a new version of agent 681 may be available for device 630 and response 714 instructs agent 681 to update itself and provides the necessary information for agent 681 to perform the update. Tracking response 714 comprises one or more data packets communicable over Internet 34 to device 630.

Further, if device 630 is listed as stolen in database 60, notification 712 is communicated to the appropriate handler along with the indication that device 630 is a stolen device. The geographic information may be used to assist the handler, such as a human administrator, in recovering the stolen device and locating the thief. Also, when device 630 is reported stolen, tracking response 714 may instruct agent 681 to take special action. For example, agent 681 may be operable to disable device 630 temporarily and tracking response 714 may instruct agent 681 to take such action to render device 630 useless to the thief. For another example, agent 681 may be instructed to visually and auditorily indicate that device 630 is stolen. In this example, agent 681 acts in a manner similar to a car alarm by attempting to bring attention to the fact that device 630 is a stolen device. For yet another example, agent 681 may add a visual indication to device 630, such as on a video display associated with device 630, that device 630 has been stolen and agent 681 may display the stolen device indication in such a manner that a user using device 630 is unable to hide the indication.

FIG. 11A is a block diagram illustrating details of agent 681. Agent 681 comprises foundation services 720, monitoring services 722, and other services 724.

Foundation services 720 comprise beacon communicator 632, a class library 730, a communication system 732 and an encryption system 734. Class library 730 comprises a portion of agent 681 operable to receive information from monitoring services 722 and other services 724 and format the information into beacon packet 640. Communication system 732 comprises a portion of agent 681 operable to support communication over Internet 34 and other data communication systems by class library 730. Communication system 732 allows the use of multiple and different networking protocols and technology with agent 681 without requiring a distinct agent 681 for each networking protocol or technology. System 732 is typically configured to operate with the network, such as internet 34, to which device 630 having agent 681 will be coupled. Encryption system 734 comprises a portion of agent 681 operable to support encryption of information in beacon packet 640 using class library 730.

Monitoring services 722 comprise service parameters 740, ASM alerting service 744, and threshold monitoring 746. Service parameters 740 comprise one or more parameters for controlling the operation of service 744. For example, parameters 740 may indicate which health-indicative operating parameters, such as those previously described, are monitored by monitor 746. Service 744 comprises a portion of agent 681 operable to collect information from sentinels 748 and monitor 746 and communicating the collected information to class library 730. Threshold monitor 746 comprises a portion of agent 681 operable to monitor one or more health indicative operating parameters associated with device 630, such as those previously described, determine if the health indicative operating parameters exceed predetermined thresholds associated with the health indicative operating parameters, and to inform service 744 of the elements which exceed the predetermined thresholds.

Other services 724 comprise service parameters 750, other services 752 and processing 754. Service parameters 750 configure other services 752. Other services 752 comprise other services provided by agent 681 as configured by service parameter 750. Other services may comprise any suitable additional services associated with device 630 and operable to communicate with server 744. Processing 754 comprises processing services operable to support other services 752.

One or more exception sentinels 748 may communicate with agent 681 using Internet 34 or any other suitable data communications network. Exception sentinels 748 comprise one or more applications operable to monitor and generate information about devices 630 and are described in more detail in association with FIGS. 14–16.

In operation, other services 752 collect information based on service parameter 750 and pass the information to service 744. Service 744 also receives health indicative information from threshold monitor 746 and exception sentinel 748. Service 744 then processes the information received from monitor 746, sentinel 748 and other services 752 based on service parameters 740. For example, parameters 740 may specify that information from particular monitors 746 and sentinels 748 be passed on to class library 730 for communication to operations center 12, while information from other sentinels 748 be handled locally by service 744. Service 744 may also generate new information and modify received information based on parameters 740. In general, parameters 740 may specify distinct processing to be applied to any of the information, or portions thereof, received from monitors 746, sentinels 748 and other services 752. Next, service 744 will communicate information to class library 730 based on parameters 740 for communication to operations center 12.

Agent 740 then uses communications system 732 to properly format the information from service 744 for transmission over Internet 34. In particular, class library 730 packetizes the information into payload portion 642 of a beacon packet 640 and applies the appropriate network header and routing information based on system 732 to header 644 for communication over Internet 34 or other suitable network to which device 630 is coupled. Class library 730 then encrypts payload portion 642 based on encryption system 734. In the disclosed embodiment, a public key-private key system is used wherein encryption system 734 provides a public key associated with operations center 12 for use by class library 730 in encrypting payload portion 642. Class library 730 then communicates beacon packet over Internet 34 to operations center 12.

FIG. 11B is a flowchart illustrating a method for generating a device identifier for a particular monitored device 630 and beaconing information to operations center from the particular monitored device 630. The method begins at step 900 where seed 636 is deployed to monitored device 630. In the disclosed embodiment, deploying seed 636 comprises receiving seed 636 via electronic mail and installing seed 636 on monitored device 630. Alternatively, seed 636 may be deployed by being downloaded from a server on a local area network (LAN), by being downloaded over Internet 34, by being provided on a magnetic disk or a CD-ROM, and by any other suitable method. Next, at step 902, the device identifier associated with monitored device 630 is generated by seed 636. The device identifier is generated using a predetermined algorithm for yielding a unique value for the device 630 using any one of a serial number associated with device 630, the serial number associated with the Intel Pentium® III processor by Intel Corporation of Santa Clara, Calif., a desktop management interface (DMI) address, a network interface card (NIC) address and by any other suitable method. The device identifier may also be manually assigned by operations center 12 or by an administrator 100 or 140. The method used for generating the device identifier is stored in service parameters 740.

Then, at step 904, seed 636 acquires personalization information from an administrator, such as device administrator 100 or site administrator 140, associated with the monitored device 630. In the disclosed embodiment, the personalization information comprises at least one of the site identifier, the first and last name of the user, the phone number, the electronic mail address of the user, the serial number, the model number, and the location associated with device 630 as well as any proxy system used with device 630 and whether device 630 is a mobile device.

Proceeding to step 906, the data generated and collected by seed 636 is communicated to operations center 12 over Internet 34. Next, at step 908, operation center 12 replies to monitored device 630 with the success message. Operations center 12 will reply with the success message if the seed and personalization data has been successfully received, and a valid license exists for device 630. The success message indicates that device 630 is now registered. At step 910, agent 681 activates in response to receiving the success message from operation center 12. If no valid license exists for device 630, then operations center 12 will not respond with the success message and agent 681 will remain deactivated. This process protects against agents 681 and seeds 636 being installed on devices 630 for which an administrator has not contracted for service.

For example, the serial number associated with the processor on device 630 may be communicated to operations center 12 by seed 636 along with a code indicating that the serial number is a serial number associated with the processor. At operations center 12, a unique value is generated for the device 630 being registered by seed 636, the unique value indicating the license number associated with the device 630 for tracking subscription and accounting information associated with the license associated with the device 630. A further unique value is then generated at operations center 12 for activating agent 681. More specifically, the further unique value may comprise the unique value used for the license number combined with the serial number associated with the processor and a checksum value, such as a cyclic-redundancy-check value. Any other methods may be used for generating license identifiers, device identifiers and agent activation values.

Once agent 681 has been activated, at step 912, agent 681 generates beacon packet 640. In the disclosed embodiment, beacon packet 640 includes a device identifier associated with the device and generated by seed 636, the IP address associated with the device, the services installed on the device, and a status code. Next, at step 914, agent 681 regenerates the device identifier associated with the monitored device 630 and uses the same method for generating the device identifier as originally used by seed 636 for the particular device 630 and stored in parameters 740. At step 916, the newly generated device identifier is compared with the existing device identifier and at decisional step 918 agent 681 determines if the two identifiers are the same. If the two identifiers are not the same, then the NO branch of decisional step 918 is followed to step 920 where an identifier notification is added to beacon packet 640. More specifically, the status code is updated to indicate a device identifier mismatch. If the two identifiers are the same, then the YES branch of decisional step 918 is followed to step 922. At step 922, beacon packet 640 is sent to operations center 12 and is received at step 924.

At step 926, operations center 12 evaluates the data in beacon packet 924 and determines whether a unit of work need to be generated for monitored device 630. Operations center 12 also evaluates the status code to determine whether beacon packet 640 has been received from a properly licensed device 630. If the status code indicates a device identifier mismatch, operations center 12 may ignore beacon packet 640 because device 630 may not be licensed. Operations center 12 may also inform an appropriate contact 32 of the mismatch. In general, operations center 12 may take any suitable action to handle mismatched device identifiers.

The unit of work may comprise one or more requests to which the monitored device must respond, such as for inventory information, re-registering of the monitored device 630, updating, adding and deleting of software on monitored device 630, and any other suitable task capable of being performed by the particular monitored device 630. In the disclosed embodiment, a single unit of work is generated for device 630. Alternatively, multiple units of work may be generated for device 630.

At step 928, one or more packing slips are generated for the unit of work to be performed at monitored device 630. The packing slips may indicate scripts, applications and/or applets for supporting and performing the unit of work at the monitored device 630. Next, at step 929, the applets, applications and scripts indicated by the packing slips are added to the units of work for communication to device 630. Then, at step 930, operation center 12 communicates the unit of work and packing slips to the monitored device 630 in a beacon packet 640 replying to the monitored device's beacon packet 640.

Figure 12:
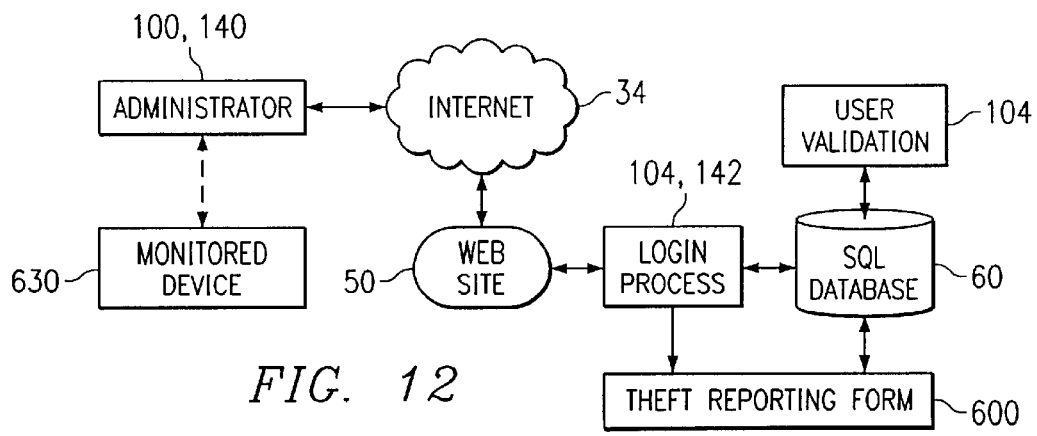
FIG. 12 is a flow diagram illustrating reporting that the monitored device of FIG. 11 has been stolen.

FIG. 12 is a flow diagram illustrating reporting that monitored device 630 has been stolen. To report device 630 as missing or stolen, an administrator associated with device 630, such as device administrator 100 and site administrator 140, logs into web site 50 over Internet 34. After the administrator is logged in, the administrator is presented with a theft reporting form 600. Form 600 comprises a web based form having various fields for accepting input from the administrator. In the disclosed embodiment, the fields comprise the date the device was stolen, a description of the stolen device, the date a police report regarding the stolen device was filed and the date an insurance report regarding the stolen device was filed. Form 600 also automatically provides the date that the theft was reported to system 10. Form 600 then communicates the information to device table 66 of database 60 where the information is stored in association with device 630 which has been reported stolen. Form 600 further includes a date recovered field indicating the date that the stolen device is recovered. Entering a date in the date recovered field indicates that the stolen device has been recovered and is no longer stolen. Once the device is no longer stolen tracking response 714 may be communicated to device 630 to undo special actions previously taken, for example, to re-enable device 630 or remove a stolen device indication.

Figure 13:
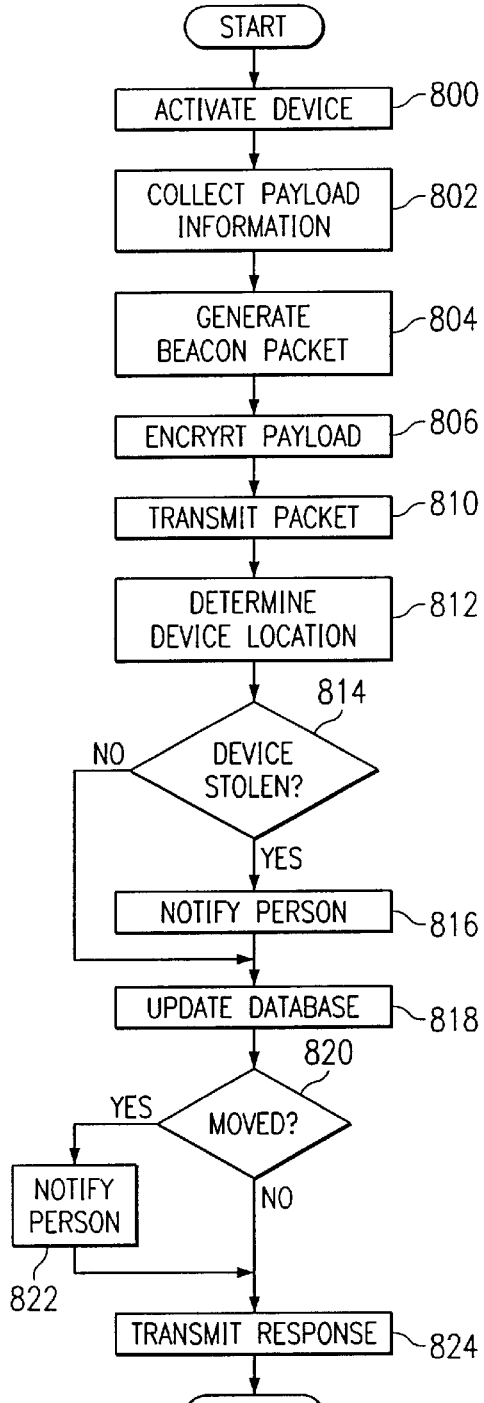
FIG. 13 is a flowchart illustrating a method for tracking the monitored devices of FIG. 11.

FIG. 13 is a flowchart illustrating a method for tracking devices 630. The method begins at step 800 where device 630 is activated. Agent 681 generates beacon packet 640 at device activation or at other times based on beacon criteria 634. Next, at step 802, location indicator information for payload portion 642 of beacon packet 640 is collected by agent 681. For example, the IP address of device 630, an IP address associated with the network to which device 630 is connected, the device identifier associated with device 630, the version of agent 681 which generated beacon packet 640 and the cellular phone region where device 630 is currently located are collected. Then, at step 804, beacon packet 640 is generated and the payload information collected at step 802 is added to payload portion 642.

Proceeding to step 806, payload portion 642 is optionally encrypted based on beacon criteria 634. When agent 681 is deployed to device 630, beacon criteria 634 is configured to indicate whether payload portion 642 should be encrypted. Payload portion 642 may be encrypted, for example, to prevent employees and others from knowing what information is being communicated by beacon packet 640. In the disclosed embodiment, payload portion 642 is encrypted using a public key-private key encryption algorithm. Specifically, a public key associated with operation center 12 and encoded into beacon criteria 634 is used to encrypt payload portion 642.

Proceeding to step 810, beacon packet 640 is transmitted over Internet 34 to operations center 12. Then, at step 812, beacon packet 640 is received at operation center 12 by process 710 and process 710 attempts to determine the current geographic location of device 630 using the various location indicators. In the disclosed embodiment, the location indicators comprise the IP address associated with device 630 and the IP addresses associated with the network to which device 630 is connected. Using the location indicators, a probable geographic location of device 630 is determined by looking-up the ownership, domain and location information associated with the location indicators and attempting to determine the geographic location therefrom. Alternatively, when device 630 is a cellular device, the geographic location may be generally determined based on the cellular tower through which the cellular device is communicating. Any other suitable system for determining geographic location may be used, such as GPS information available from device 630.

Next, at decisional step 814, process 710 queries database 60 to determine whether device 630 which generated beacon packet 640 at step 804 has been reported as stolen. If device 630 is reported as stolen then the YES branch of decisional step 814 is followed to step 816 where the appropriate person associated with device 630, such as system administrator 140 and/or device administrator 100, are notified that a stolen device has been detected with notification 712. Alternatively, an automated process may be notified. The method then continues to step 818. If the device has not been reported as stolen then the NO branch of decisional step 814 is followed to step 818.

At step 818, database 60, and specifically device table 66, is updated using information in payload portion 642 of packet 640. Specifically, the location indicator information associated with device 630 and stored in database 60 is updated with the location indicator information in packet 640. In the disclosed embodiment, the IP address and network addresses associated with device 630 which generated packet 640 are updated to indicate the current IP address and current network addresses.

Proceeding to decisional step 820, theft listening process 710 determines whether device 630 has moved to a new location. The determination of whether device 630 has moved is determined based on whether any location indicator information was updated in step 818. If no location indicator information was updated, the NO branch of decisional step 820 is followed and the method ends. If any location indicator information was updated, then the YES branch of decisional step 820 will be followed to step 822 where the appropriate person, such as site administrator 140 and device administrator 100, is notified. Alternatively, notification 712 may be communicated to an automated system for tracking device 630.

Then, at step 824, tracking response 714 is generated and transmitted to device 630. Tracking response 714 may inform agent 681 and/or communicator 632 to update themselves using the information in response 714.

When device 630 is stolen, tracking response 714 may additionally indicate some special action device 630 should perform, such as disabling itself or sounding and displaying an alarm. For example, tracking response 714 may instruct agent 681 to begin recording all keystrokes and data entered into device 630 and to transmit that information to operations center 12. By recording all keystrokes and data, the identity of the thief or more accurate location information may be determined about device 630. In general, any suitable action may be specified to be performed in response to theft or other situations.

Tracking response 714 may also be used to control location dependent capabilities of device 630 in response to a change in the location or in response to the current location of device 630. For example, if device 630 has moved from one time zone to another, tracking response 714 may be used to instruct agent 681 to change a time zone and clock associated with device 630. For another example, if device 630 has moved from one country to another, response 714 may instruct agent 681 to use a particular language based on the new location.

Figure 14:
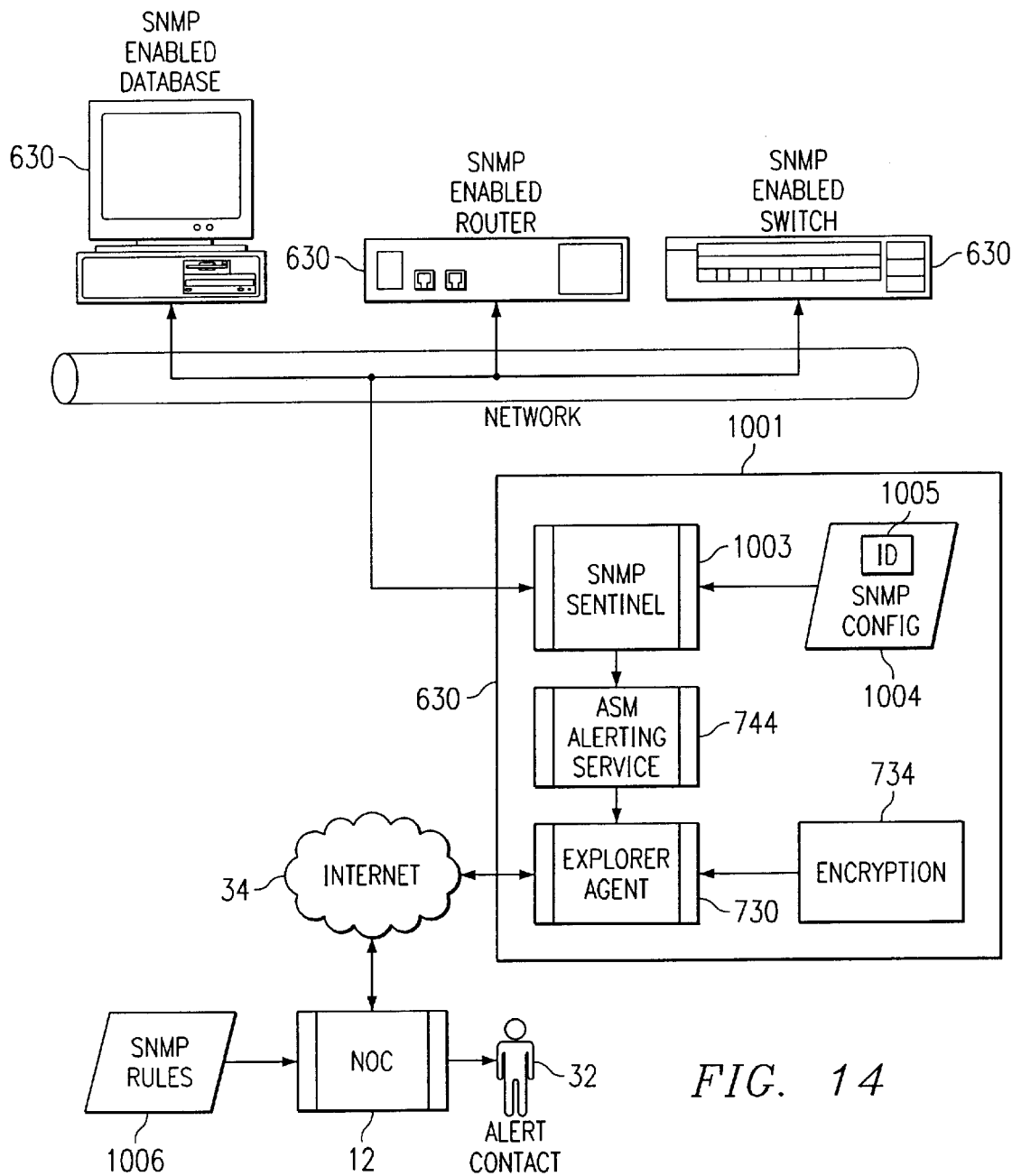
FIG. 14 is a block diagram illustrating a system which comprises one embodiment of the present invention operable to provide Simple Network Management Protocol device monitoring.

FIG. 14 is a block diagram illustrating a system 1000 which comprises one embodiment of system 10 operable to provide Simple Network Management Protocol (SNMP) device monitoring. System 1000 comprises a plurality of monitored devices 630 and a SNMP monitor server 1001. It should be noted that server 1001 may itself also be a monitored device 630.

Server 1001 comprises a SNMP sentinel 1003, a SNMP configuration file 1004, service 744, library 730 and encryption system 734. SNMP sentinel 1003, which comprises one of the exception sentinels 748 (FIG. 11A), comprises a hardware or software application for receiving SNMP data, such as SNMP traps, from devices 630 and handling the SNMP data based on SNMP configuration file 1004. SNMP configuration file 1004 comprises configuration information provided by an administrator associated with server 1001, such as device administrator 100 or site administrator 104, indicating how SNMP sentinel 1003 is to handle SNMP data from devices 630.

SNMP configuration file 1004 also comprises a virtual device identifier 1005 associated with each SNMP device to be monitored. Virtual device identifier 1005 may be used to determine whether a valid license exists for the monitored SNMP device. The virtual device identifier may be used because some devices 630 may not be capable of storing a device identifier. In the disclosed embodiment, SNMP devices are identified by sentinel 1003 based on an IP address associated with the SNMP device, however, any suitable identifier associated with the SNMP device may be used, such as a hardware identifier or an Ethernet address.

In operation, SNMP sentinel 1003 is installed on server 1001 by a device administrator 100 associated with one or more monitored devices 630. One or more Management Information Bases (MIBs) associated with devices 630 to be monitored by SNMP sentinel 1003 are then associated with sentinel 1003. In the disclosed embodiment, the MIBs are installed on server 1001 such that sentinel 1003 may access the MIBs. File 1004 is then configured to indicate which MIB variables are to be monitored for which devices 630 by sentinel 1003. For example, an SNMP enabled router may be monitored for total packets handled while an SNMP enabled switch may be monitored for processing latency at the switch. In general, any suitable combination of variables for any suitable combination of devices 630 may be monitored by sentinel 1003 as indicated by file 1004.

After the MIB for a particular device has been installed, a virtual device identifier 1005 for that device is generated by sentinel 1003 and communicated to operations center 12 in a registration packet. In the disclosed embodiment, the registration packet is communicated using a beacon packet 640. Alternatively, sentinel 1003 may request a virtual device identifier 1005 from operations center 12 using beacon packet 640. Operations center 12 may then generate a virtual device identifier 1005 for the SNMP device and provide the generated identifier 1005 to server 1001 to be stored in file 1004 and associated with the monitored SNMP device. Operations center 12 may also refuse to provide a virtual device identifier 1005 if, for example, no site license is available for site 14 associated with the SNMP device to be monitored. Operations center 12 may also refuse to provide identifier 1005 for any suitable reason. Operations center 12 may generate virtual device identifiers 1005 similarly to the generation of device identifiers as described above in association with FIG. 11B. Alternatively, virtual device identifiers 1005 may be requested from operations center 12. In general, any method may be used to generate virtual device identifiers 1005 such that each identifier 1005 is unique.

SNMP capable devices 630 are then configured to send SNMP data to server 1001. For example, device 630 may be configured to communicate an SNMP packet to server 1001 when a new peripheral component interconnect (PCI) card is added to the device 630. For another example, device 630 may be configured to communicate SNMP data to server 1001 when device 630 is rebooted. In general, device 630 may be configured to communicate SNMP data to server 1001 based on any suitable event, occurrence or data detected at device 630 based on the management information base (MIB) associated with device 630.

Server 1001 receives the SNMP data generated by devices 630 at SNMP sentinel 1003. If no identifier 1005 is associated with the SNMP device which generated the SNMP data, sentinel 1003 may discard the data as coming from an unauthorized source. SNMP sentinel 1003 then examines the received SNMP data and handles the data based on information within the SNMP configuration file 1004. For example, SNMP configuration file 1004 may specify that SNMP sentinel 1003 ignore SNMP data from devices 630 which indicates a power failure, log data from device 630 indicating that device 630 has had new hardware added to the device, and pass on SNMP data to operation center 12 indicating that device 630 has had new software installed. Any SNMP data which SNMP sentinel 1003 has been configured to pass on to operation center 12 is then passed by service 744 to class library 730 for encryption and communication to operations center 12. The virtual device identifier 1005 associated with the SNMP device which generated the SNMP data is also communicated to operations center 12.

At operations center 12, beacon packet 640 is received from server 1001 and stored in database 60. Operations center 12 then determines whether a valid license is associated with identifier 1005. If the license is invalid or no license is associated with identifier 1005, then beacon packet 640 may be discarded by operations center 12, an alert may also be sent to notify an associated alert contact 32 that a license has become invalid. If the license is valid, then operation center 12 applies one or more rules 1006 to beacon packet 640 received from server 1001. Rules 1006 comprise information stored at operations center 12 which indicate to operation center 12 how to handle data, such as SNMP traps, received from server 1001. More specifically, operation center 12 may store traps in a log for later use by administrator, such as device administrator 100 or site administrator 140 associated with server 1001, generate an alert to notify alert contact 32 or perform other suitable actions. For example, rules 1006 may specify that when new software is added to device 630 and detected by sentinel 1003, that an alert be sent to a particular alert contact 32, such as an administrator, to verify that a license has been properly obtained for the newly installed software. In general, rules 1006 may specify any suitable operation to be taken in response to particular types of SNMP data based on the configuration provided to operations center 12 by the administrator associated with server 1001 and/or devices 630.

Figure 15:
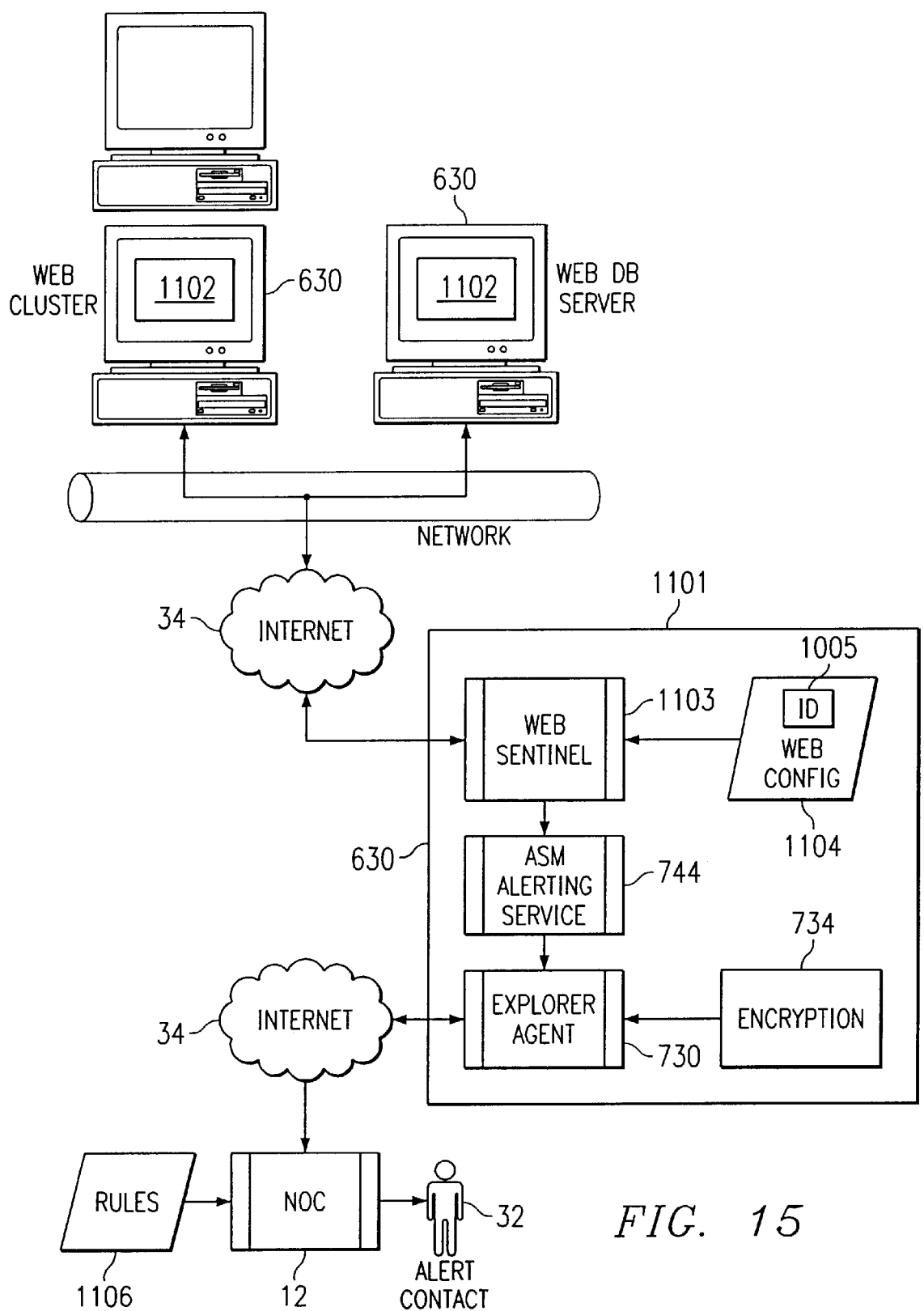
FIG. 15 is a block diagram illustrating a system which comprises one embodiment of the present invention operable to provide web device monitoring.

FIG. 15 is a block diagram illustrating a system 1100 which comprises one embodiment of system 10 operable to provide web device monitoring. System 1100 comprises a plurality of monitored devices 630 and a web monitor server 1101. It should be noted that server 1101 may itself also be a monitored device 630. In this embodiment of system 10, the monitored devices 630 may comprise one or more web servers. The web servers may be arranged in clusters or may operate individually. One or more web sites 1102, each comprising one or more web pages (not shown), may be respectively supported on the web servers. Web sites 1102 may be sites on an intranet, an extranet, the Internet, a site on a Virtual Private Network (VPN) or other logical and physical network sites which are to be monitored.

Server 1101 comprises a web sentinel 1103, a web configuration file 1104, service 744, library 730 and encryption system 734. Web sentinel 1103 comprises a hardware or software application for retrieving data associated with Uniform Resource Locators (URLs) from web site 1102 and examining the retrieved URL data based on web configuration file 1104. Web sentinel 1103 comprises one of the exception sentinels 748. Web configuration file 1104 comprises configuration information provided by an administrator associated with server 1101, such as device administrator 100 or site administrator 104, indicating the data expected to be retrieved from particular URLs at web sites 1112. File 1104 also comprises virtual device identifier 1005 associated with each URL and/or web site 1102 to be monitored. Identifier 1005 may be associated with individual URLs to be monitored, with an Internet domain, or with a particular site 1102. Various options are provided to allow flexibility to the administrator in determining which portions of site 1102 are to be monitored.

In operation, web sites 1102 are supported at monitored devices 630. Web sentinel 1103 is then configured by the administrator associated to retrieve particular URLs from web sites 1102. More specifically, one or more URLs are specified to be retrieved by sentinel 1103 and the retrieved data is compared to the expected data in configuration file 1104. In general, sentinel 1103 may be configured to retrieve URL data from site 1102 based on any suitable event, occurrence, outcome, error message, at periodic intervals or times, or based on other suitable criteria.

The expected data in configuration file 1104 may be determined for each URL to be monitored by retrieving the monitored URLs and storing the result as the expected result for later comparison. The administrator configuring file 1104 may then examine the retrieved URL data to verify that the correct data has been retrieved for use as the expected result.

In one embodiment, sentinel 1103 retrieves the specified URLs and compares the data retrieved to the expected result. The result of the comparison is then evaluated by sentinel 1103 and the result of the comparison is handled based on information within web configuration file 1104. For example, web configuration file 1104 may specify that application ignore Domain Name Service errors encountered when retrieving URLs while sending on Server Too Busy errors to operations center 12. For another example, if the retrieved URL data does not match the expected result, such as when a database or script is returning incorrect information, the retrieved data may be sent on to operations center 12 so that the problem can be repaired. In addition, the expected result may also be send on to operations center 12 for use in performing repairs. Any URL data which web sentinel 1103 has been configured to pass on to operations center 12 is then passed by service 744 to class library 730 for encryption and communication to operations center 12. The virtual device identifier 1005 associated with the retrieved URL, the domain associated with the retrieved URL or the web site 1102 associated with the retrieved URL is also communicated to operations center 12 in beacon packet 640.

At operations center 12, beacon packet 640 is received from server 1101 and stored in database 60. Operations center 12 then determines whether a valid license is associated with identifier 1005. If the license is invalid or no license is associated with identifier 1005, then beacon packet 640 may be discarded by operations center 12, an alert may also be sent to notify an associated alert contact 32 that a license has become invalid. If the license is valid, then operation center 12 applies one or more web rules 1106 to beacon packet 640 received from server 1101. Web rules 1106 comprise information stored at operations center 12 which indicate to operations center 12 how to handle URL data received from server 1101. More specifically, operation center 12 may store URL data in a log for later use by an administrator, generate an alert to notify alert contact 32 or perform other suitable actions. For example, web rules 1106 may specify that when Server Too Busy errors are encountered that an alert be sent to alert contact 32. For another example, when the retrieved URL data does not match the expected result, both the expected data and the retrieved data may be sent to alert contact 32 so that the problem may be resolved. In general, web rules 1006 may specify any suitable operation to be taken in response to particular types of URL data, errors and other information based on the configuration provided to operations center 12 by the administrator.

Figure 16:
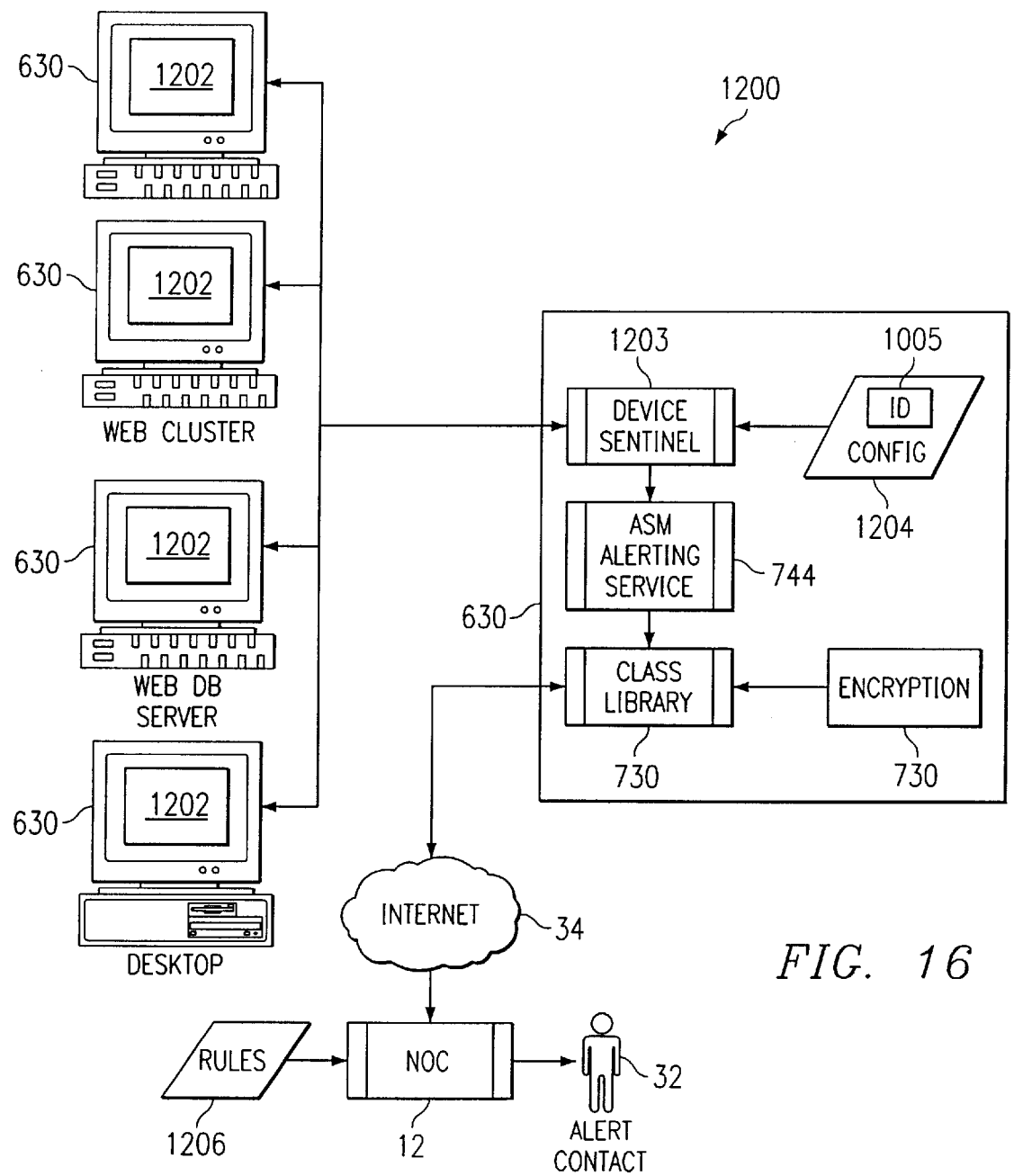
FIG. 16 is a block diagram illustrating a system which comprises one embodiment of the present invention operable to provide device status monitoring.

FIG. 16 is a block diagram illustrating a system 1200 which comprises one embodiment of system 10 operable to provide device status monitoring. System 1200 comprises a plurality of monitored devices 630 and a device monitor server 1201. It should be noted that server 1201 may itself also be a monitored device 630.

Server 1201 comprises a device sentinel 1203, a configuration file 1204, service 744, library 730 and encryption system 734. Sentinel 1203 comprises a hardware or software application for determining whether one or more monitored devices 630 is operational and responding to non-operational devices 630 based on configuration file 1204. Configuration file 1204 comprises configuration information provided by an administrator associated with server 1201, such as device administrator 100 or site administrator 104, indicating how application 1203 is to handle detection of non-operational devices 630 detected by sentinel 1202. Configuration file 1204 may also comprise identifiers 1005 associated with devices 630 to be monitored.

In operation, sentinel 1203 is installed at server 1201 by an administrator associated with devices 630. Sentinel 1203 is then configured by the administrator associated to monitor devices 630 to determine if the devices 630 are operational. In the disclosed embodiment, devices 630 are pinged using the PING protocol associated with the TCP/IP protocol and sending one or more ping packets to device 630 at predetermined intervals specified in file 1204. Alternatively, sentinel 1203 may communicate directly with agent 681 on a monitored device 630. Other suitable methods for determining whether device 630 is operational may be used. Next, a virtual device identifier 1005 is generated for each device 630 that does not have a device identifier already associated with it. The identifiers 1005 may be generated directly by sentinel 1203 or by operations center 12.

Sentinel 1203 then responds to detecting a non-operational device based on information within configuration file 1204. For example, sentinel 1203 may attempt to restart certain devices 630 while passing on that other devices 630 are non-operational to operations center 12. Sentinel 1203 may also take multiple actions, such as attempting to restart non-operational devices 630 while also informing operations center 12 of the non-operational device 630. Any data which application 1203 has been configured to pass on to operations center 12 is then passed by service 744 to class library 730 for encryption and communication to operations center 12 in beacon packet 640. The device identifier or the virtual device identifier 1005 associated with the non-operational device 630 is also communicated to operations center 12.

At operations center 12, beacon packet 640 is received from server 1201 and stored in database 60. Operations center 12 then determines whether a valid license is associated with identifier 1005. If the license is invalid or no license is associated with identifier 1005 or the device identifier associated with the non-operational device 630, then beacon packet 640 may be discarded by operations center 12, an alert may also be sent to notify an associated alert contact 32 that a license has become invalid. If the license is valid, then operations center 12 applies one or more device sentinel rules 1206 to beacon packet 640 received from server 1201. Rules 1206 comprise information stored at operations center 12 which indicate to operation center 12 how to handle non-operational devices detected by server 1201. More specifically, operation center 12 may store which devices 630 are non-operational, along with the time the device 630 was determined to be non-operational and other suitable information, in a log for later use by an administrator, generate an alert to notify alert contact 32 and/or perform other suitable actions in response to beacon packet 640. In general, rules 1206 may specify any suitable operations to be taken in response to determining that a particular device is non-operational based on the configuration provided to operations center 12 by the administrator. Also, different actions may be specified based on the particular device 630 which is non-operational.

It should be noted that while servers 1001, 1101 and 1201 have been described separately, any or all of servers 1001, 1101 and 1201 may comprise a single physical server. Also, while sentinels 1003, 1103 and 1203 have been described separately, any or all of sentinels 1003, 1103 and 1203 may be used simultaneously on single physical server. Further, while configuration files 1004, 1104 and 1204 have been described separately, any or all of files 1004, 1104 and 1204 may comprise a single physical file.

The present invention provides a number of technical advantages. One such technical advantage is the ability to detect and track devices. Also, another technical advantage is the ability to detect and track stolen devices. These abilities may assist a business with decreasing losses due to theft and misplacement of devices.

Although one embodiment has been illustrated and described in detail, it should be understood that various substitutions and alterations can be made therein without departing from the scope of the present invention. For example, although the operations center is described as a single location, it could encompass several locations, for example, to serve different geographic areas.

It should also be recognized that other changes, substitutions and alterations are also possible without departing from the spirit and scope of the present invention, as defined by the following claims.

What is claimed is:

1. A device tracking system comprising:
   a communications network;
   a device to be tracked, the device operable to receive an agent downloaded from the communication network, the agent executing as a software application on the device, the agent being unidirectionally coupled to the communications network and operable to generate a beacon packet according to predetermined criteria, the beacon packet having at least one location indicator therein;
   a listener coupled to the communications network and operable to receive the beacon packet and generate a response packet in response to receiving the beacon packet, the response packet operable to control the device; and
   a handler operable to act in response to the beacon packet.

2. The tracking system according to claim 1, wherein the beacon packet comprises an encrypted payload portion having the location indicators therein.

3. The tracking system according to claim 1, wherein the listener resides at an operations center, the operations center being coupled to the communications network and operable to receive the beacon packet from the listener and to notify the handler in response to the alert.

4. The tracking system according to claim 1, wherein the operations center further comprises a web site operable to provide a theft reporting user interface.

5. The tracking system according to claim 1, wherein the location indicator comprises a cellular phone network location.

6. The tracking system according to claim 1, wherein the location indicator comprises a plurality of computer network addresses associated with the device.

7. The tracking system according to claim 1 wherein the location indicators comprise a probable geographic location of the device.

8. The tracking system according to claim 1, wherein the unidirectional coupling of the agent to the communications network provides initiation of data transmission only outbound from the agent to the communications network.

9. The tracking system according to claim 1 further comprising a predetermined communications channel used by the operations center to notify the handler and wherein the predetermined communications channel is selected from the group consisting essentially of electronic mail, a pager, a facsimile and a phone call.

10. The tracking system according to claim 1, wherein the response packet is operable to disable the device when the device has been stolen.

11. A method for device tracking comprising the steps of:
    receiving a software application at a device downloaded from a communications network;
    generating a beacon packet from the software application associated with the device based on predetermined criteria;

communicating the beacon packet over a communications link of the communications network from the software application to a listening process;

determining at least one current location indicator associated with the device;

determining whether the device has moved from a previous location;

providing the location indicators to a handler in response to the beacon packet; and controlling the device based on the location indicators.

12. The method for device tracking according to claim 11 further including updating a database when the current location indicators indicate a different location from the previous location.

13. The method for device tracking according to claim 11, wherein the location indicators comprise a cellular phone network location.

14. The method for device tracking according to claim 11, wherein controlling the device based on the location indicators comprises changing location dependent capabilities associated with the device.

15. The method for device tracking according to claim 11 further including determining a probable geographic location of the device based on computer network addresses associated with the device.

16. A method for theft tracking comprising the steps of:

receiving a software application at a device downloaded from a communication network generating a beacon packet from the software application associated with the device based on predetermined criteria;

communicating the beacon packet over a communications link of the communication network from the software application to a listening process;

determining whether the device has been stolen;

determining at least one location indicator associated with the device;

providing the location indicator to a handler in response to the beacon packet; and controlling the device when the device has been stolen.

17. The method for theft tracking according to claim 16, wherein the location indicator comprises a cellular phone network location.

18. The method for theft tracking according to claim 16, wherein the location indicator comprises a plurality of computer network addresses associated with the device.

19. The method for theft tracking according to claim 18 further including determining a probable geographic location of the device based on the computer network addresses.

20. The method for theft tracking according to claim 16 further including encrypting a payload portion of the beacon packet and wherein the location indicators are stored in the payload portion.

21. The method for theft tracking according to claim 16, wherein the predetermined criteria indicates that the beacon packet is to be generated when the device is activated.

22. The method for theft tracking according to claim 16, wherein the predetermined criteria indicates that the beacon packet is to be generated at periodic time intervals.

23. The method for theft tracking according to claim 16 further comprising the steps of:

contracting with the operations center to monitor at least one device associated with an organization;

deploying the software application as a monitoring agent to the device; and reporting the device as stolen.

24. The method for theft tracking according to claim 23, wherein the contracting step comprises:

providing, by a user associated with the organization, to the operations center site information, the site information identifying a technical administrator and a site administrator;

requesting, by the user, at least one license from the operations center; and allocating the at least one license to the organization.

25. The method for theft tracking according to claim 23, wherein reporting the device as stolen comprises:

accessing a theft report web site associated with the operations center;

identifying the device as stolen using the web site; and updating a device table to indicate that the device is stolen.

26. The method for theft tracking according to claim 23, wherein the deploying the monitoring agent comprises:

transmitting the monitoring agent from the operations center to the device, wherein the agent provides only unidirectional communications capabilities and the unidirectional communications capabilities allow initiation of only outbound transmission of information from the device;

installing the agent on the device;

generating, by the agent, a registration trap at the device, the registration trap including an address associated with the device; and transmitting the registration trap to the operations center.

27. The method for theft tracking according to claim 16 further comprising:

receiving the beacon packet by a listener at the operations center;

validating a device identifier and license identifier associated with the beacon packet at the operations center;

querying a database based on the beacon packet;

adding the beacon packet to an event table; and dispatching the beacon packet to a notifier.

28. The method for theft tracking according to claim 16, wherein unidirectionally communicating the beacon packet comprises communicating only from the device to the operations center.

29. The method for theft tracking according to claim 16, wherein controlling the device comprises disabling the device when the device is stolen.

30. The method for theft tracking according to claim 16, wherein controlling the device comprises displaying a non-removable visual indication that the device is stolen.

* * * * *